US011550491B2

(12) United States Patent
Beedu et al.

(10) Patent No.: US 11,550,491 B2
(45) Date of Patent: Jan. 10, 2023

(54) CONTAINER-BASED APPLICATION PROCESSING

(71) Applicant: Nutanix, Inc., San Jose, CA (US)

(72) Inventors: Bharat Kumar Beedu, Santa Clara, CA (US); Naveen Kumar, Bangalore (IN); Niranjan Sanjiv Pendharkar, Pune (IN); Pranab Patnaik, Cary, NC (US)

(73) Assignee: Nutanix, Inc.

( * ) Notice: Subject to any disclaimer, the term of this patent is extended or adjusted under 35 U.S.C. 154(b) by 0 days.

(21) Appl. No.: 17/444,181

(22) Filed: Jul. 30, 2021

(65) Prior Publication Data

US 2022/0350492 A1 Nov. 3, 2022

(51) Int. Cl.
*G06F 3/06* (2006.01)
*G06F 9/455* (2018.01)

(52) U.S. Cl.
CPC ............ *G06F 3/065* (2013.01); *G06F 3/0604* (2013.01); *G06F 3/067* (2013.01); *G06F 9/45558* (2013.01); *G06F 2009/45583* (2013.01)

(58) Field of Classification Search
CPC ......... G06F 3/065; G06F 3/0604; G06F 3/067
USPC .................................................. 711/154, 161
See application file for complete search history.

(56) References Cited

U.S. PATENT DOCUMENTS 8,549,518 B1 10/2013 Aron et al.
8,601,473 B1 12/2013 Aron et al.
8,850,130 B1 9/2014 Aron et al.
9,772,866 B1 9/2017 Aron et al.
10,892,942 B2 1/2021 Rangasamy et al.
2016/0357443 A1* 12/2016 Li ....................... G06F 11/1448
(Continued)

FOREIGN PATENT DOCUMENTS

CN 110727547 A 1/2020
CN 110851237 A 2/2020

OTHER PUBLICATIONS

Poitras, Steven. "The Nutanix Bible" (Oct. 15, 2013), from http://stevenpoitras.com/the-nutanix-bible/ (Publication date based on indicated capture date byArchive.org; first publication date unknown).
(Continued)

*Primary Examiner* — Than Nguyen
(74) *Attorney, Agent, or Firm* — Vista IP Law Group, LLP

(57) ABSTRACT

Methods, systems, and computer program products for moving a container-based application from a source HCl cluster to a target HCl cluster. An HCl storage cluster data replication mechanism operates to copy data and metadata from a plurality of storage devices that constitute a storage pool of the source HCl cluster. A container-based application replication mechanism operates to copy data and metadata from an executable container that is running on a node of the source HCl cluster. Periodically (1) the state of the container-based application is saved using the container-based application replication mechanism, and (2) the state of the storage cluster data of the HCl storage cluster is saved using the HCl storage cluster data replication mechanism. The saved state of the container-based application including its application data and metadata are combined with the saved state of the storage cluster data to bring-up the container-based application at the target HCl cluster.

24 Claims, 23 Drawing Sheets

(56) References Cited

U.S. PATENT DOCUMENTS

| | | | | |
|---|---|---|---|---|
| 2016/0378525 | A1* | 12/2016 | Bjorkengren | G06F 9/45558 718/1 |
| 2017/0364347 | A1* | 12/2017 | Adler | G06F 16/119 |
| 2020/0379660 | A1* | 12/2020 | Ciudad | G06F 3/067 |
| 2021/0004292 | A1 | 1/2021 | Zlotnick et al. | |
| 2021/0149769 | A1* | 5/2021 | Balcha | G06F 11/1469 |
| 2021/0279111 | A1* | 9/2021 | Ranjan | G06F 9/5077 |

OTHER PUBLICATIONS

Poitras, Steven. "The Nutanix Bible" (Jan. 11, 2014), from http://stevenpoitras.com/the-nutanix-bible/ (Publication date based on indicated capture date byArchive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date byArchive.org; first publication date unknown).
Poitras, Steven. "The Nutanix Bible" (Jun. 9, 2015), from http://stevenpoitras.com/the-nutanix-bible/ (Publication date based on indicated capture date byArchive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/(Publication date based on indicated capture date byArchive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/(Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Cano, I. et al., "Curator: Self-Managing Storage for Enterprise Clusters", 14th *USENIX Symposium on Networked Systems Design and Implementation, NSDI* '17, (Mar. 27, 2017).
"Red Hat OpenShift Data Foundation overview," RedHat, dated Apr. 9, 2021, URL: https://www.redhat.com/en/resources/openshift-data-foundation-overview.
"Data Protection for Kubernetes Using Cohesity Dataplatform and HPE Apollo Servers," Hewlett Packard Enterprises, dated Apr. 2021, URL: https://www.hpe.com/psnow/doc/a00112026enw?jumpid=in_lit-psnow-red.
Chaturvedi, P., "VMware Tanzu Mission Control Expands Data Protection Capabilities," VMWare, dated Jun. 10, 2021.

* cited by examiner

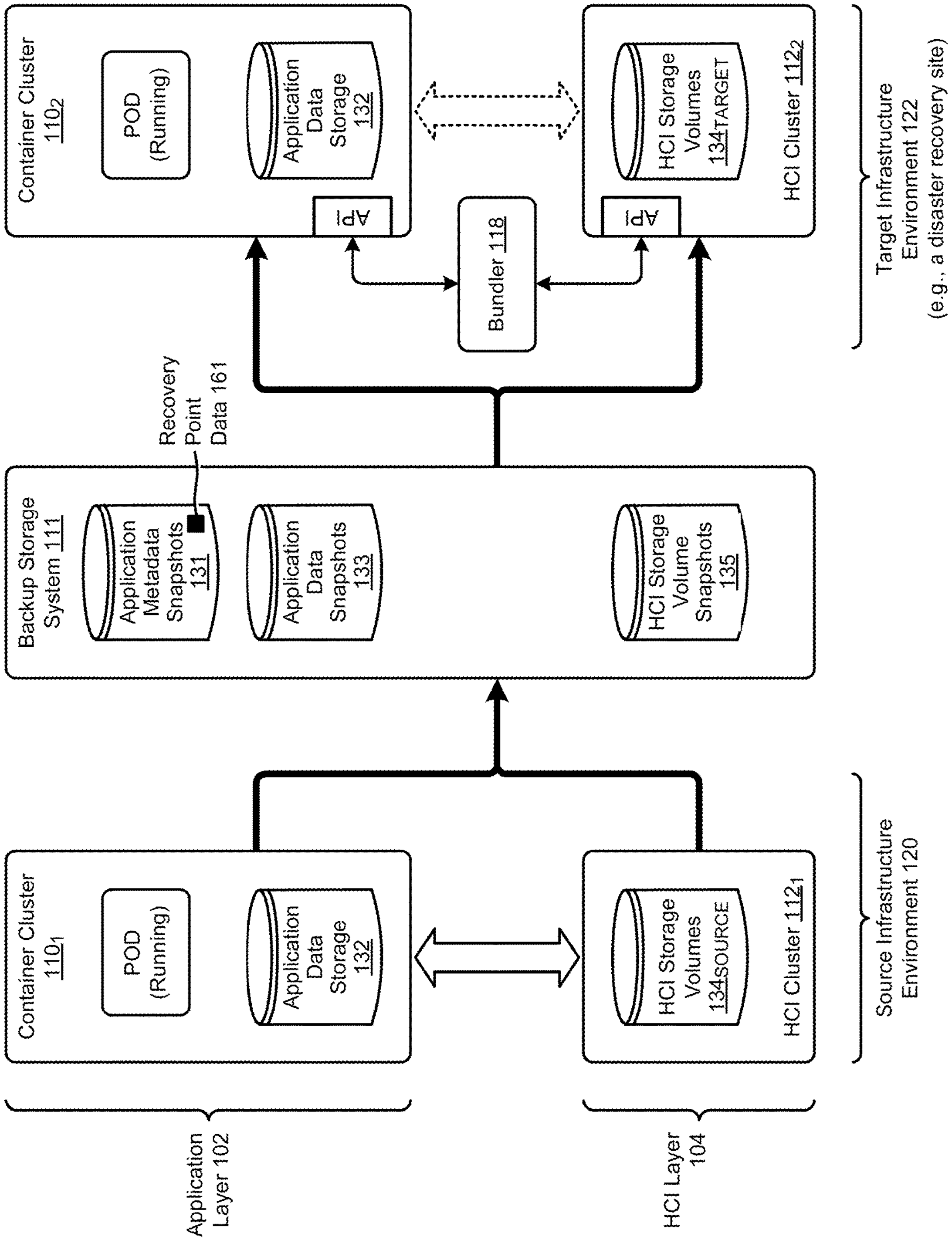
FIG. 1B1

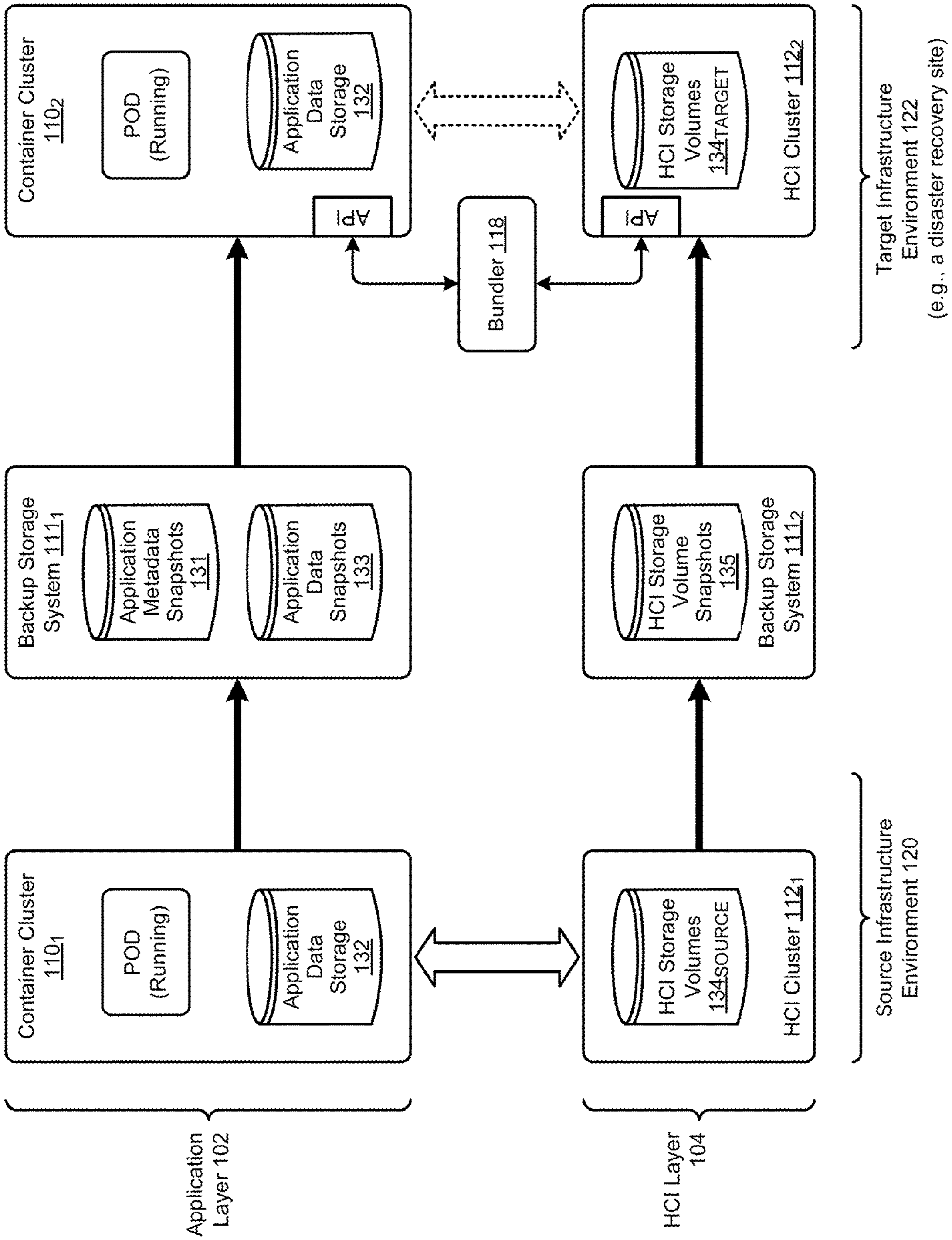
FIG. 1B2

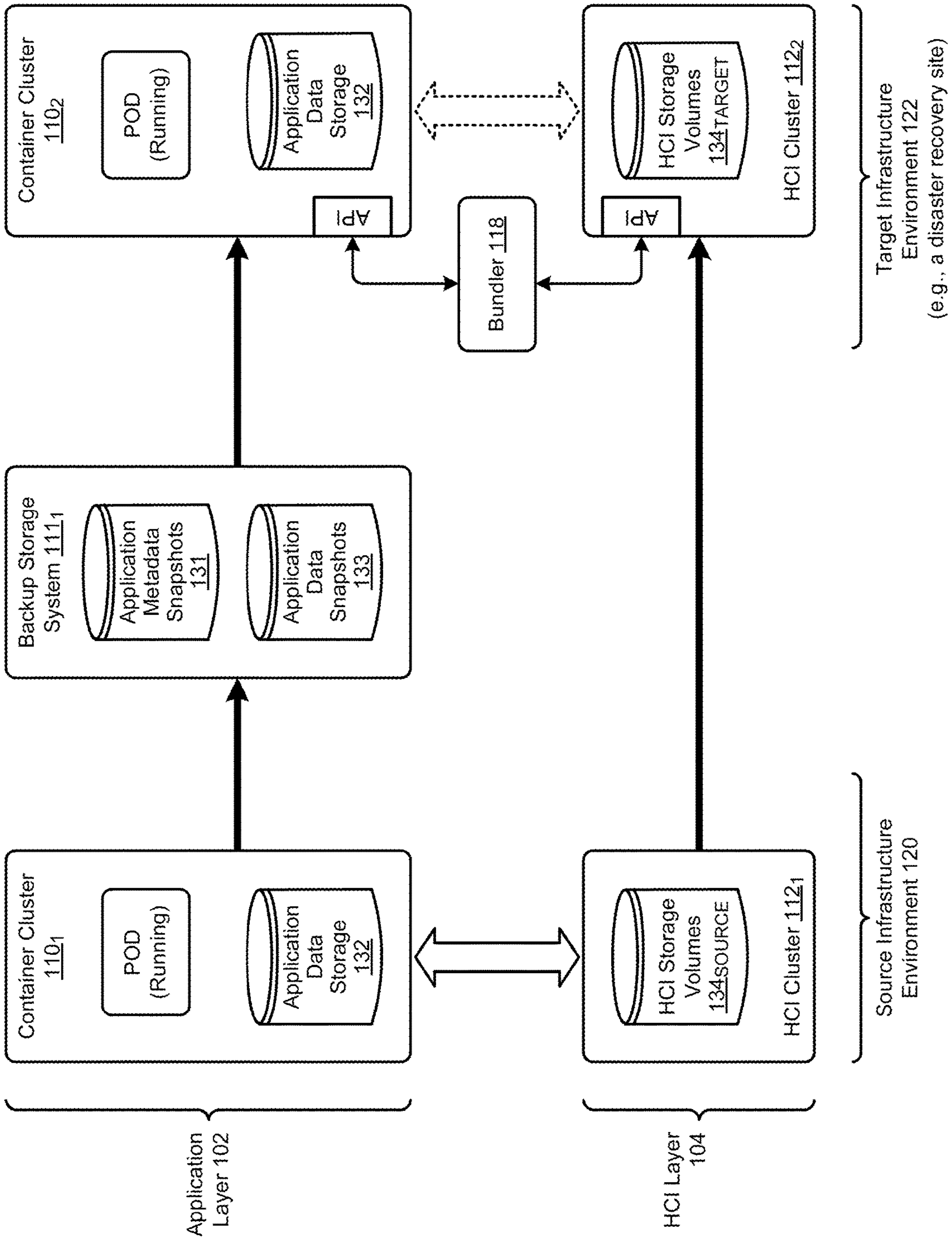
FIG. 1B3

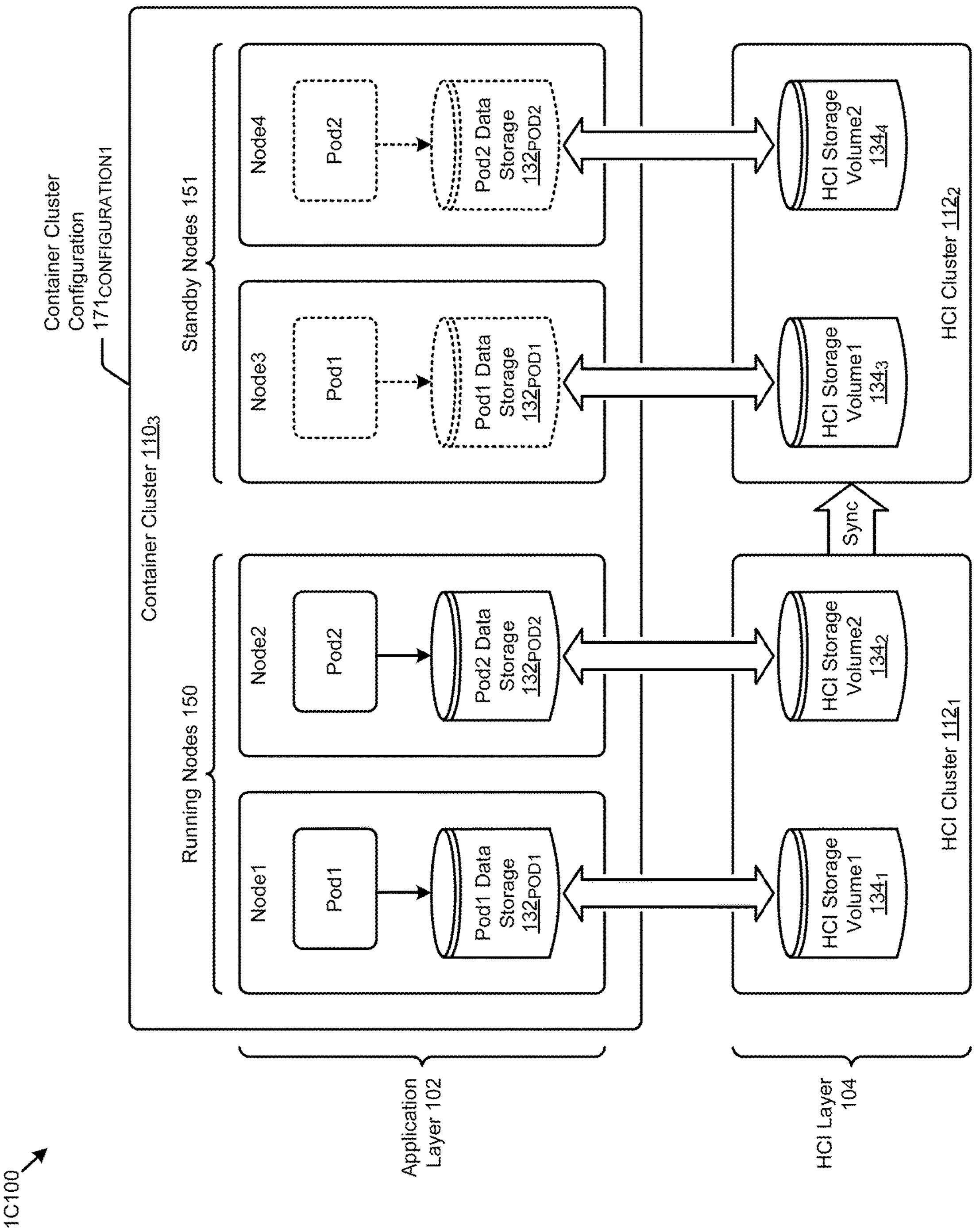
FIG. 1C1

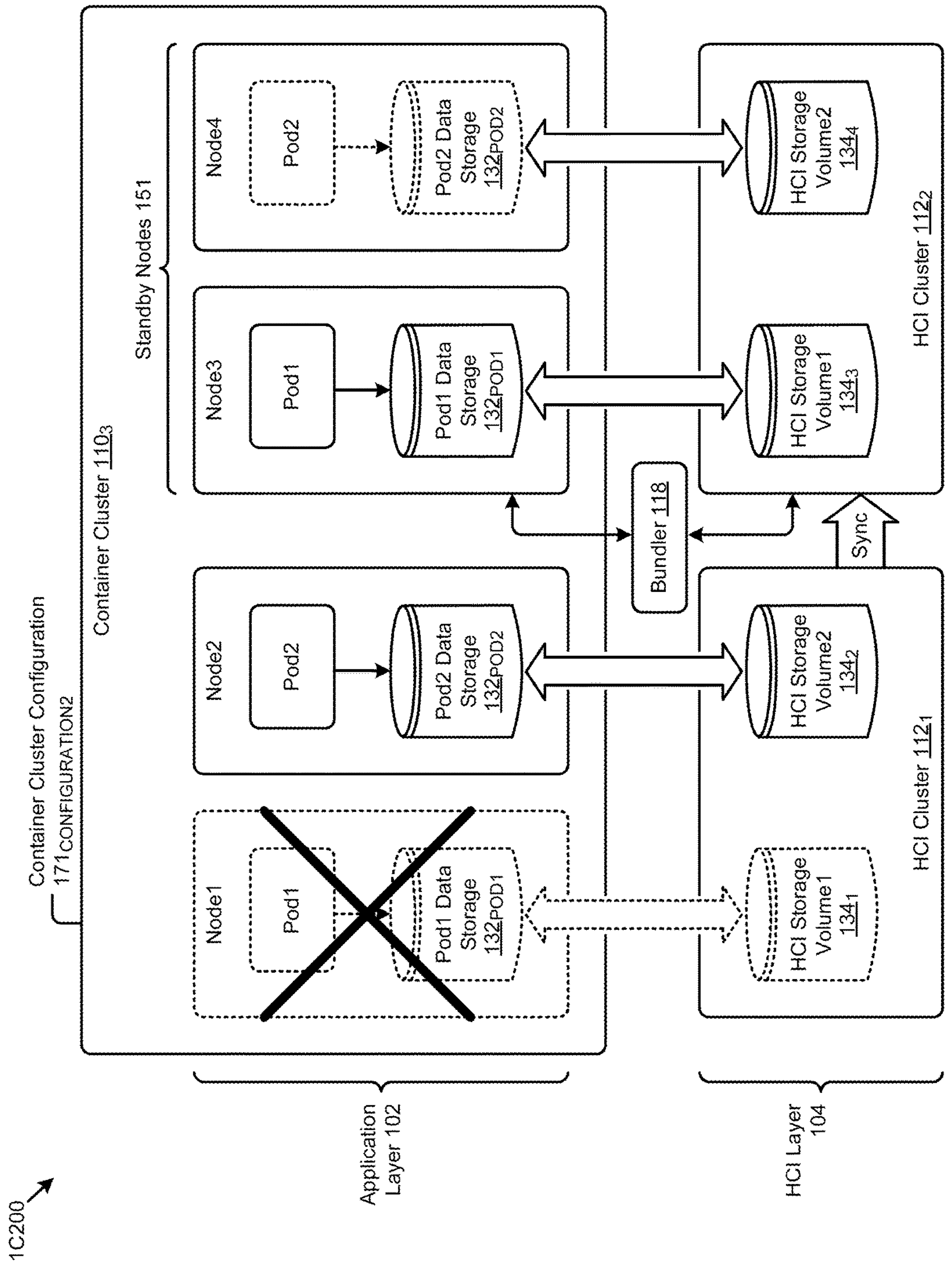
FIG. 1C2

5A00

Recovery Point Data 161

| Recovery Point ID 502 |
| --- |
| Location of Application Metadata Snapshots 504 |
| Location of Application Data Snapshots 506 |
| Timestamp 508 |
| Other |

5B00

| Application Metadata ID 522 |
| --- |
| Desired State Description 524 |
| Captured State Description 526 |
| Application Topology 528 |
| Extensibility Options 529 |

CONTAINER-BASED APPLICATION PROCESSING

RELATED APPLICATIONS

The present application claims the benefit of priority to India Provisional Patent Application Ser. No. 202141019833 titled "CONTAINER-BASED APPLICATION PROCESSING" filed on Apr. 30, 2021, which is hereby incorporated by reference in its entirety.

TECHNICAL FIELD

This disclosure relates to computing clusters, and more particularly to techniques for container-based application processing.

BACKGROUND

Use of container-based computing (e.g., based on Docker containers) has become ubiquitous. The benefits of container-based computing has inspired the code development communities to extend container-based computing to include easy-to-implement and easy-to-maintain applications (e.g., pods of executable containers) that can be deployed on a wide range of computing platforms. Various intra-container facilities provide application storage capabilities, however such intra-container storage capabilities are limited in several dimensions. Some container-based application deployments extend the executable container model to avail of storage capabilities (e.g., storage cluster) that are implemented outside of the container. This extension provides applications that are composed of one or many containers to configure a storage clusters that go far beyond the built-in, intra-container storage facilities of executable containers.

Unfortunately, merely availing such storage clusters to executable containers fails to address the high-availability, fast recovery, and portability demands of modern computing. Therefore, what is needed is a technique or techniques that address these technical problems.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for container-based application processing, which techniques advance the relevant technologies to address technological issues with legacy approaches. More specifically, the present disclosure describes techniques used in systems, methods, and in computer program products for handling application-consistent snapshots across execution environments. Certain embodiments are directed to technological solutions for binding intra-container parameters to an external storage cluster.

The disclosed embodiments modify and improve over legacy approaches. In particular, the herein-disclosed techniques provide technical solutions that address the herein-described technical problems. Such technical solutions involve specific implementations (i.e., data organization, data communication paths, module-to-module interrelationships, etc.) that relate to the software arts for improving computer functionality.

The herein-disclosed embodiments for binding intra-container parameters to an external storage cluster involve technological solutions pertaining to technological problems that arise in the hardware and software arts that underlie cloud computing. Aspects of the present disclosure achieve performance and other improvements in peripheral technical fields including, but not limited to, hyperconverged computing platform management and/or management of distributed storage systems.

Some embodiments include a sequence of instructions that are stored on a non-transitory computer readable medium. Such a sequence of instructions, when stored in memory and executed by one or more processors causes the one or more processors to perform a set of acts for binding intra-container parameters to an external storage cluster.

Some embodiments include the aforementioned sequence of instructions that are stored in a memory, which memory is interfaced to one or more processors such that the one or more processors can execute the sequence of instructions to cause the one or more processors to implement acts for binding intra-container parameters to an external storage cluster.

In various embodiments, any combinations of any of the above can be combined to perform any variations of acts for handling application-consistent snapshots across execution environments, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1B1 exemplifies a snapshot-based backup and recovery technique used in systems that handle application-consistent snapshots across execution environments, according to an embodiment.

FIG. 1B2 exemplifies a first alternative snapshot-based backup and recovery technique used in systems that handle application-consistent snapshots across execution environments, according to an embodiment.

FIG. 1B3 exemplifies a second alternative snapshot-based backup and recovery technique used in systems that handle application-consistent snapshots across execution environments, according to an embodiment.

FIG. 1C1 exemplifies a standby-based application recovery architecture, according to an embodiment.

FIG. 1C2 exemplifies an alternative standby-based application recovery architecture, according to an embodiment.

DETAILED DESCRIPTION

Figure 1A:
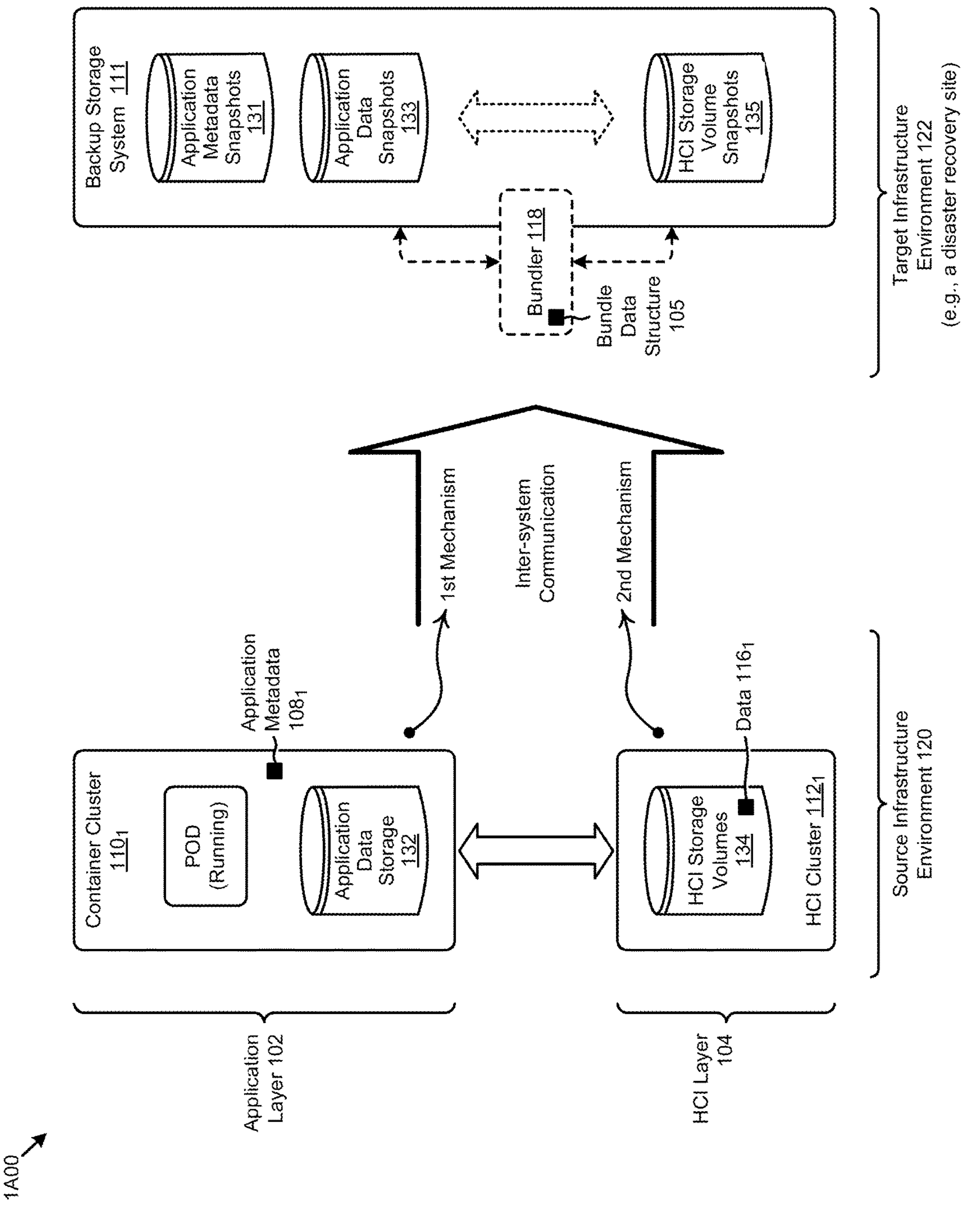
FIG. 1A exemplifies an environment in which embodiments of the present disclosure can operate.

Aspects of the present disclosure solve problems associated with using computer systems that use extra-container storage facilities. Some embodiments are directed to approaches for binding intra-container parameters to an external storage cluster. The accompanying figures and discussions herein present example environments, systems, methods, and computer program products for handling application-consistent snapshots across execution environments.

Overview

As disclosed herein, a fully-featured storage cluster capability can be tied to a container-based computing application in a manner that meets the high-availability, fast recovery and portability demands of modern container-based computing.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an environment 1A00 in which embodiments of the present disclosure can operate. As an option, one or more variations of environment or any aspect thereof may be implemented in the context of the architecture and functionality of the embodiments described herein.

The figure is being presented to exemplify an environment in which an application in a container cluster 1101 is configured to be interfaced with hyperconverged computing infrastructure (HCl) storage volumes 134. This arrangement supports use of high-performance HCl storage volumes by the application(s) running in the container cluster. Further, this arrangement facilitates inter-system communication and synchronization such that a disaster recovery regime can be implemented. Specifically, (1) the application running in the container cluster within a source system (e.g., shown as source infrastructure environment 120) can transmit backup snapshots to a backup storage system 111 of a target system (e.g., shown as target infrastructure environment 122), and (2) the HCl storage volumes within the source system (e.g., shown as source infrastructure environment 120) can also transmit backup snapshots to backup storage system 111 in a target system (e.g., shown as target infrastructure environment 122).

A first set of backup snapshots arise as a consequence of events that take place in the application layer 102, and a second set of backup snapshots arise as a consequence of events that take place on the HCl layer 104. In some cases, and as shown, the first set up backups include (1) application metadata snapshots 131, and application data snapshots 133. Further, in some cases, and as shown, the second set of backup snapshots comprise HCl storage volume snapshots 135. The mechanism for creating, transmitting and storing backup snapshots of the application data storage 132 and the mechanism for creating, transmitting and storing backup snapshots of the HCl storage volumes 134 are different.

To illustrate, and corresponding to the embodiment of FIG. 1A, the application runs in the POD and, over time, many snapshots of the application data storage are created, transmitted and stored in a cadence determined based on the application, whereas the cadence for creating, transmitting and storing backups of the HCl storage volumes is based on policies such as may be defined in a service level agreement (SLA).

An application in a configuration such as shown in FIG. 1A may access container-local application data storage 132 as well as HCl storage volumes 134. This bifurcated data storage organization can be highly beneficial to application functionality, at least in that application data that is intended to be local to the shown application data storage 132 can be configured to be local to the POD, whereas other data that is intended to be shared beyond the POD can be maintained in one or more HCl storage volumes. Merely as one example, a container-based application might rely on a database service that distributes its data across the storage devices of the nodes that constitute the HCl cluster. As such, when the application is moved from one HCl cluster to another location, the data and state of the application as well as the HCl data storage needs to be moved in tandem. Ongoing readiness for carrying out such a move can be facilitated by (1) periodically taking snapshots of the application and its states (e.g., its application data and metadata) as well as (2) periodically taking snapshots of the HCl data as used by the database service. These two snapshots can be stitched together at any later moment in time, on any suitable platform. Various techniques can be used to ensure that the data of the snapshots are application-consistent.

Any combination of snapshots can be taken at any moment in time. For example, at a first time, a snapshot of application metadata 1081 of a running application be taken while, at a second time, a snapshot of application data storage 132 can be taken while, at a third time, a snapshot of data $\mathbf{116}_1$ from HCl storage volumes 134 of HCl cluster $\mathbf{112}_1$ can be taken. The snapshots can comport with any format. The snapshot may contain or be associated with a time that pertains to the moment in time when the snapshot was taken. The specific combination of snapshots may be determined at any moment in time. Moreover, the specific combination of snapshots may be determined in a manner that guarantees application consistency between the particular combination of snapshots.

As used herein a POD (or pod) is a grouping of containerized components. A pod consists of one or more containers that are co-located on the same computing node. A pod may be assigned a unique IP address. Within a particular pod, all containers can reference each other on localhost. A pod can define a storage unit such as a local disk directory or a network disk, and expose it to the containers itself. In some cases, pods can be managed manually through application programming interfaces (APIs). Additionally or alternatively, management can be delegated to infrastructure management tools. Storage units can include access to the pod's configuration, which configuration may be defined and modified periodically by the aforementioned infrastructure management tool or tools.

Any one or more containerized components or any sets or groupings of containerized components can be subsumed within the bounds of a virtual machine. In some cases, a single containerized component is subjected to a corresponding backup schedule. In other cases, a set or grouping of containerized components are subjected to a group-wide backup schedule. In still other cases, containerized component or a set or grouping of containerized components can be subsumed into a virtual machine and the containerized component or a set or grouping of containerized components are subjected to a backup schedule that pertains to the subsuming virtual machine.

In any of the forgoing cases, a backup schedule or plurality of backup schedules can be defined for an application that is implemented by (1) a containerized component (e.g., a single container) or alternatively, (2) an application that is implemented by a grouping of containerized components, or alternatively (3) an application that is implemented by a virtual machine that includes one or more of the foregoing containerized components. Moreover, any individual single container within a virtual machine can be independently backed up to a target infrastructure. Such a capability is provided as discussed herein. More specifically, any individual single container or grouping of containers within a virtual machine can be independently backed up to a target infrastructure—even if the individual single container is subsumed into a virtual machine. The particular backup mechanisms involved can be coordinated such that application consistency of the backups is maintained.

Further details regarding general approaches to maintaining application consistency are described in U.S. Pat. No. 10,942,822 titled "CONSISTENCY GROUP RESTORATION FROM A SECONDARY SITE" issued on Mar. 9, 2021, which is hereby incorporated by reference in its entirety.

The data comprising the combination of snapshots can be stored in a manner that facilitates restoration of the data of the snapshots into a running system. More specifically, a bundler 118 can be deployed, which bundler can be configured (e.g., using a bundle data structure 105) to relate a particular first set of snapshots (e.g., application metadata snapshots 131 and application data snapshots 133) to a second set of snapshots (e.g., HCl storage volume snapshots 135). Moreover, the bundler can be configured to relate the various snapshots in an application-consistent manner and so as to facilitate a recovery of an application and its data at a restore location. The restore location can be different from the source location.

Various possible techniques for implementing snapshot-based backup and recovery as used in systems that handle application-consistent snapshots across execution environments are shown and described as pertains to FIG. 1B1, FIG. 1B2, and FIG. 1B3.

FIG. 1B1 exemplifies a snapshot-based backup and recovery technique used in systems that handle application-consistent snapshots across execution environments. As an option, one or more variations of snapshot-based backup and recovery technique or any aspect thereof may be implemented in the context of the architecture and functionality of the embodiments described herein. The snapshot-based backup and recovery technique or any aspect thereof may be implemented in any environment.

As shown, the application metadata snapshots 131 includes recovery point data 161. This recovery point data, in combination with corresponding application metadata snapshots 131, application data snapshots 133, and HCl storage volume snapshots 135 can be brought into a target infrastructure environment 122 (e.g., a disaster recovery site) at will. More specifically, a bundler 118 or other agent can access the content of backup storage system 111 and bring a particular combination of snapshots into the target infrastructure environment. The specific combination of snapshots into the target infrastructure environment can be determined based on the contents of recovery point data. In the embodiment shown, the bundler relies in part on application programming interfaces (APIs). In this configuration, the bundler is able to retrieve the particular combination of snapshots from the backup storage system and bring them into the target infrastructure environment. Still more specifically, the bundler is able to configure a container cluster 110$_2$ to host a running POD with its application data storage 132 that has been restored from any one or more application data snapshots 133 of the backup storage system 111.

As can now be appreciated, the infrastructure of the target infrastructure environment 122 might be significantly different from source infrastructure environment 120. As such, some mechanism needs to be provided to be able to bring up a running application together with its HCl storage volumes in spite of differences between the target infrastructure environment 122 as compared to the source infrastructure environment 120. Moreover the bundler or other agent needs to be able to retrieve any particular combination of snapshots from any one or more backup storage systems so as to bring them into the target infrastructure environment. One alternative mechanism for storage of snapshots in different substrates is shown and described as pertains to FIG. 1B2.

As shown in FIG. 1B2, application metadata snapshots 131 and application data snapshots can be stored in a first backup storage system 111$_1$, whereas HCl storage volume snapshots 135 (e.g., as taken from HCl storage volumes 134$_{SOURCE}$) can be stored in a second backup storage system 111$_2$, and nevertheless, the bundler 118 can reconstitute the application metadata snapshots 131 and the application data snapshots 133 into a running application in container cluster 110$_2$. The bundler can further reconstitute the HCl storage volume snapshots onto a running HCl cluster 112$_2$, which running HCl cluster can host any HCl storage volumes (e.g., HCl storage volumes 134$_{TARGET}$) so as to present an HCl storage volume to the running application.

In some situations, and as exemplified in FIG. 1B3, high availability data of the HCl storage volumes might be continuously synchronized with an HCl cluster 112$_2$ that is running in a standby mode within target infrastructure environment 122. Regardless, the bundler 118 can determine (1) how the application can be restored into container cluster 110$_2$ based on supplication metadata snapshots and application data snapshots, and (2) how, during the restoration procedure, the application can be connected to HCl storage volumes 134$_{TARGET}$.

FIG. 1C1 exemplifies a standby-based application recovery architecture 1C100. As an option, one or more variations of standby-based application recovery architecture or any aspect thereof may be implemented in the context of the architecture and functionality of the embodiments described herein. The standby-based application recovery architecture or any aspect thereof may be implemented in any environment and/or under a variety of situations and/or conditions.

As shown, a standby-based application recovery architecture includes a container cluster orchestrator that is in a standby/active configuration. This standby/active state is depicted by the configuration of the contents of container cluster configuration 171$_{CONFIGURATION1}$. Specifically, the configuration of the container cluster 110$_3$ has node1 and node2 as running nodes 150 while node3 and node4 are standby nodes 151. An orchestrator that operates on the application layer 102 serves to move pod1 and/or pod2 from node1 and/or node2 respectively to node3 and/or node4. In this manner, upon an event that affects the health of node1 and/or node2, the aforementioned orchestrator can activate pod1 and/or pod2, together with respective pod1 data storage 132$_{POD1}$ and/or pod2 data storage 132$_{POD2}$. In this manner, high availability of running executables of an application (e.g., an application as formed by pod1 and pod2) is achieved. The foregoing discusses computing elements of the application layer. However, in many cases, and as shown, an application avails of high-availability storage that is implemented by synchronized HCl clusters that are synchronized in an active/standby mode.

In many situations, executables of an application are relatively small, and as such, high availability can be assured at least since it is not computationally or bandwidth intensive to move the application to different nodes. With respect to HCl storage, however, it often happens that the storage is quite large, and as such, in order to accommodate high-availability metrics, two or more HCl storage clusters (e.g., HCl cluster 112$_1$ and HCl cluster 112$_2$) are configured as active/active clusters. In the example shown, HCl cluster 112$_1$ is synchronized in an active/active configuration where HCl storage volume1 134$_3$ serves as an active backup for HCl cluster volume1 134$_1$, and where HCl storage volume2 134$_4$ serves as an active backup for HCl cluster volume2 134$_2$).

As such, in the situation where there is some sort of loss of function of node1 or node2 or their constituent components, a fast cutover can be accomplished. One possibility that pertains to a fast cutover is to provision a cutover mechanism to be able to bind access to HCl storage volume3 134$_3$ with operational elements of node3 while retaining bindings between HCl storage volume2 134$_2$ with operational elements of node2. Such a cutover mechanism is shown and described as pertains to FIG. 1C2.

FIG. 1C2 exemplifies an alternative standby-based application recovery architecture 1C200. As an option, one or more variations of standby-based application recovery technique or any aspect thereof may be implemented in the context of the architecture and functionality of the embodiments described herein. The standby-based application recovery technique or any aspect thereof may be implemented in any environment.

The figure shows container cluster configuration 171$_{CONFIGURATION2}$ in which configuration failure event occurs. More specifically, and as depicted by the large "X" drawn through node1, one or more of the constituent components of node1 has suffered a loss of functionality. Such a loss is detected by an orchestrator and/or by one or more modules of a disaster protection facility. In this particular embodiment, such a loss is detected by bundler 118.

In the depiction of FIG. 1C2, bundler 118 is shown as being a single component that is situated in a location that is independent from either the container cluster or either of the two HCl clusters. However, in various embodiments, such a bundler can include components that are located in any cluster, and/or such a bundler can include components that are centrally located, and/or can include components that are distributed within and/or between elements of the application layer 102 and/or elements of the HCl layer 104. As depicted, the bundler can bind access to HCl storage volume1 $\mathbf{134}_3$ with operational elements of node3, while maintaining access to HCl storage volume2 $\mathbf{134}_2$ with operational elements of node2. The active/standby synchronization between HCl cluster $\mathbf{112}_1$ and HCl cluster $\mathbf{112}_2$ can continue for HCl storage volume1 $\mathbf{134}_2$ and its standby HCl storage volume4 $\mathbf{134}_4$. As such, the application comprised of Pod1 and Pod2 can continue to operate. More specifically, Pod1 can be reconfigured to run on node3 and Pod2 can continue to run on node2.

Figure 1D:
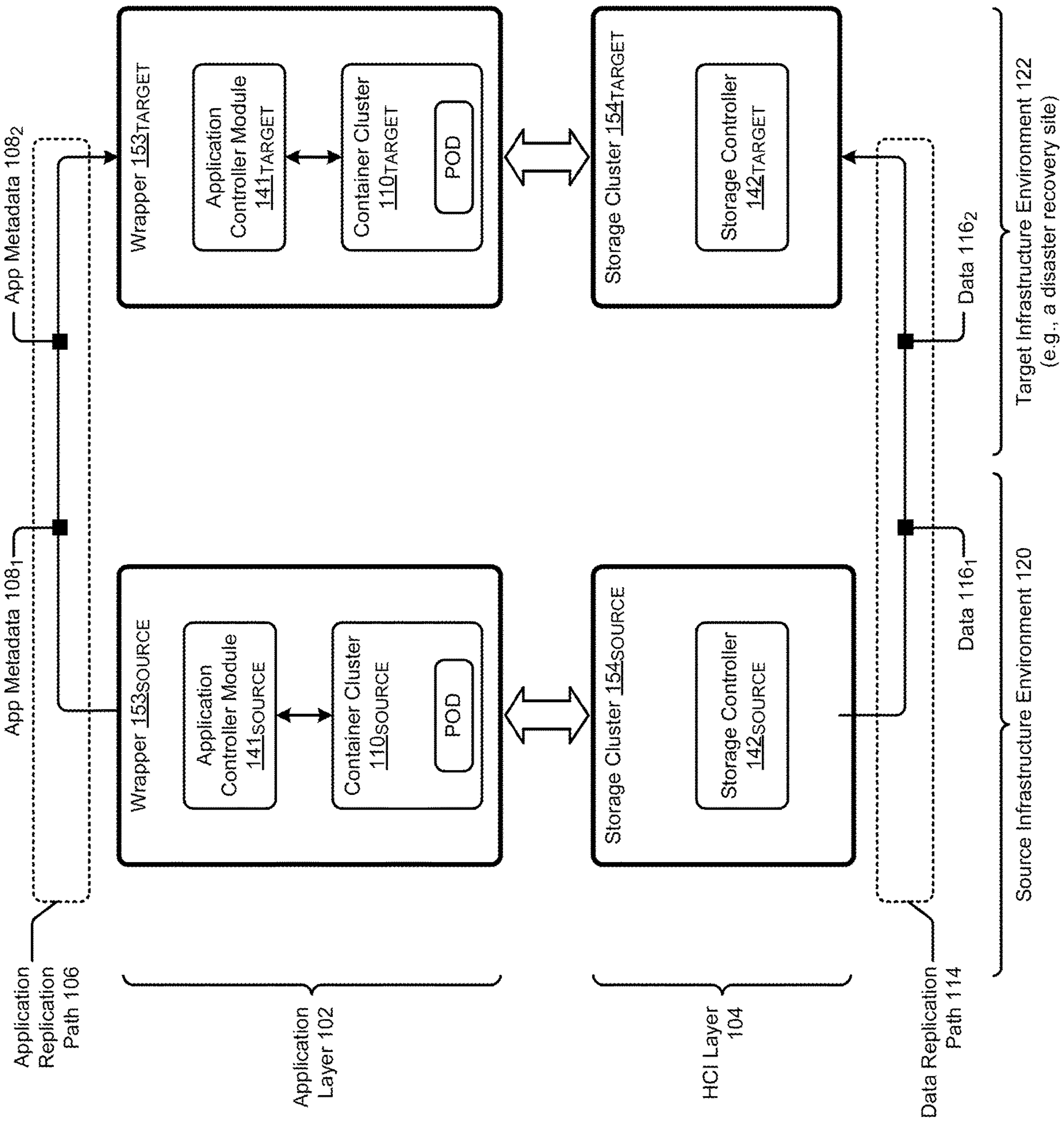
FIG. 1D depicts a wrapper module that facilitates use of independent, concurrently-operational replication paths to implement a disaster recovery capability for container-based applications, according to an embodiment.

FIG. 1D depicts a wrapper module that facilitates use of independent, concurrently-operational replication paths to implement a disaster recovery capability for container-based applications. As an option, one or more variations of independent, concurrently-operational replication paths or any aspect thereof may be implemented in the context of the architecture and functionality of the embodiments described herein. The independent, concurrently-operational replication paths or any aspect thereof may be implemented in any environment.

As shown, integration code is implemented around a source container cluster and a target container cluster. Specifically wrapper code (wrapper $\mathbf{153}_{SOURCE}$) is implemented around a source container cluster $\mathbf{110}_{SOURCE}$, and application controller module $\mathbf{141}_{SOURCE}$, whereas wrapper code (wrapper $\mathbf{153}_{TARGET}$) is implemented around a target container cluster $\mathbf{110}_{TARGET}$ and application controller module $\mathbf{141}_{TARGET}$. Furthermore, and as shown in this example implementation, instances of application controllers are in communication with a respective container clusters (e.g., container cluster $\mathbf{110}_{SOURCE}$, and/or container cluster $\mathbf{110}_{TARGET}$). Such application controllers can monitor various operational states of any number of applications that are subsumed into a respective container clusters.

An application controller can be configured to monitor ongoing changes to the configuration of the application and/or to monitor ongoing changes to the data state of the application. For example, an application controller can be configured to monitor the application as it executes in its POD configurations, while at the same time, the application controller can be configured to monitor the application's use of HCl storage. As such, an application controller can be aware of all changes made to application's configuration and/or deployment topology. Further, such an application controller can monitor (1) the application's configuration and usage of storage resources, (2) the application's configuration and usage of network resources, and (3) the application's configuration and usage of compute resources. As one specific example of monitoring the container-based application's configuration and usage of compute resources, an application controller can monitor and capture relationships between the application and any virtual machines (VM's) that the container-based application relies on for computing, networking, or storage. In some cases, the monitored and captured data states are stored in a data structure that is subsequently used to relate the container-based application's operational states to its corresponding HCl data.

Such operational states and any other data that pertains to the cluster and/or its constituent application(s) can be codified into application metadata. Application metadata can be sent using a container-based application replication mechanism (e.g., by performing replication over application replication path 106) from a source environment to a target environment. The application metadata can be sent repeatedly (e.g., as app metadata 1081, app metadata 1082, etc.) as time progresses and/or as the operational states of the constituents of the container cluster change.

In an architecture that implements paired source-target disaster recovery (e.g., for an application deployment within source infrastructure environment 120 to a target infrastructure environment 122), the foregoing application controller has instances on both the source side as well as on the target side. As changes occur to data of the storage cluster $\mathbf{154}_{SOURCE}$, such changed data can be sent over an HCl storage cluster data replication mechanism (e.g., over data replication path 114). Specifically, such changed data can be sent on an ongoing basis (e.g., as data $\mathbf{116}_1$, data $\mathbf{116}_2$, etc.) to storage cluster $\mathbf{154}_{TARGET}$. In some embodiments, and as shown, changed data can be detected by storage controller $\mathbf{142}_{SOURCE}$, sent over the data replication path, and then received and processed by storage controller $\mathbf{142}_{TARGET}$.

Further details regarding general approaches to maintaining concurrently operational paths are described in U.S. application Ser. No. 16/398,250 titled "CONTEXT-BASED DISASTER RECOVERY" filed on Apr. 29, 2019, which is hereby incorporated by reference in its entirety.

Returning to the discussion of the application metadata, such application metadata can be configured to include point-in-time status such that the application metadata can be used to reconstruct a backwards-in-time recovery point. More particularly, such application metadata (e.g., as app metadata 1081, app metadata 1082, etc.) can be used in combination with corresponding storage data (e.g., as data $\mathbf{116}_1$, data $\mathbf{116}_2$, etc.) to be able to construct—at any location—the application's operational state and the application's data state that was current as of at least one earlier point in time. A wrapper (e.g., wrapper $\mathbf{153}_{TARGET}$) and/or its agents can bind together any portions of application metadata with any portions of contemporaneous data such that the state of the system can be rolled back to a specified earlier-in-time recovery point.

In some embodiments, the application metadata corresponds to the syntax and semantics of any well-known container systems (e.g., Kubernetes). In this and other embodiments, the application metadata corresponds to a deployment scheme. In some deployments, a deployment scheme can be codified as a chart (e.g., a "Helm Chart"). A chart can include or refer to a templates directory that holds template files. When an operational element evaluates a chart, it will process all of the files in the templates directory through a template rendering engine. The results of those templates are provided to the container manager. In some cases the YAML language is used. For example, a values.yaml file can be used to contain ongoing and default values for a chart. Such values (e.g., values in a values.yaml file) may refer to specific containers, and/or specific versions of any of the constituents of the chart. In some cases, a chart is used as a map to possible combinations of application metadata and replication data. Such a map and such combinations can inform a bundler on how to bind a particular state of storage cluster data to a corresponding particular state of the application.

Figure 2A:
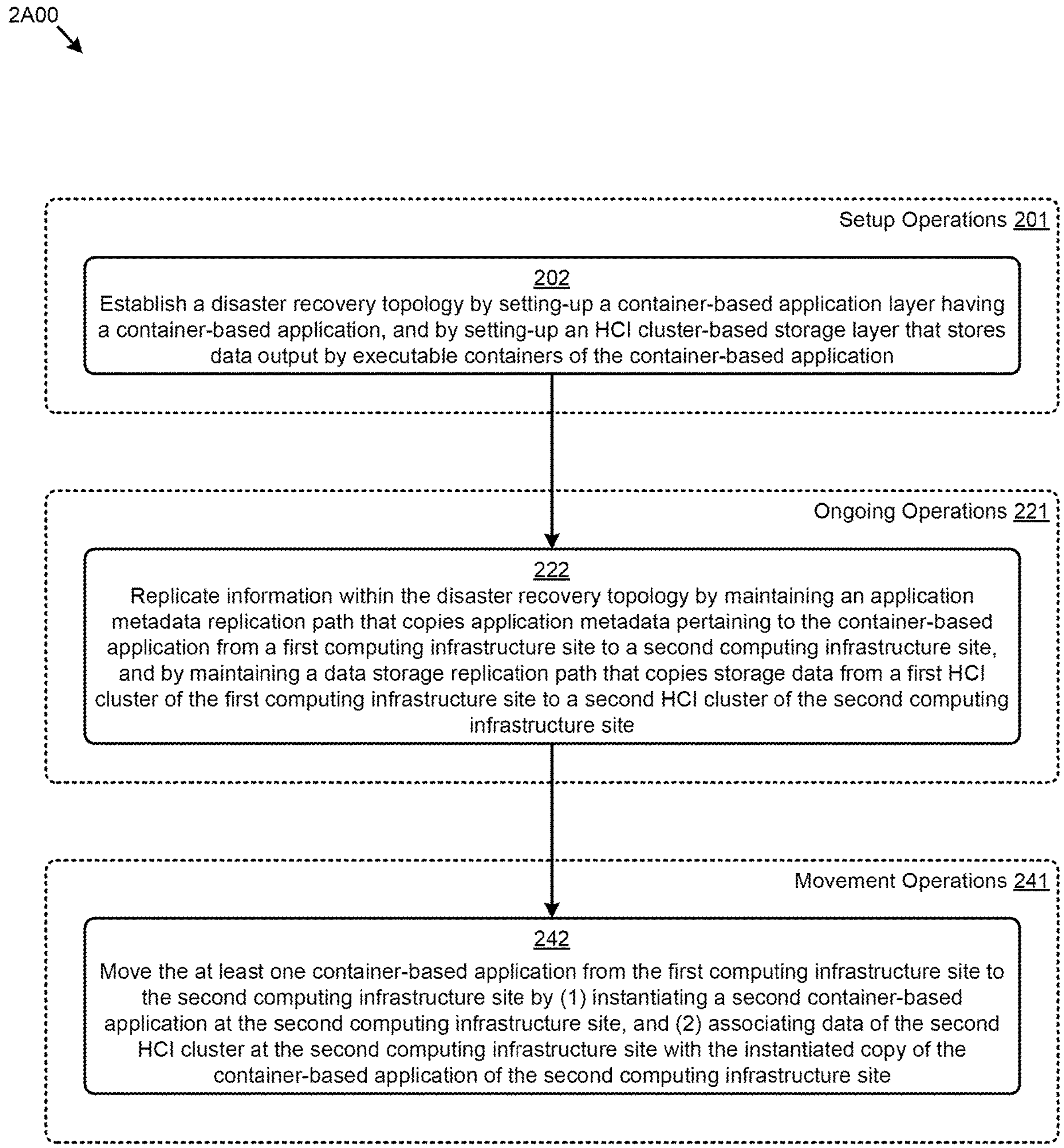
FIG. 2A shows a flowchart that includes steps for setup and implementation of a disaster recovery capability for container-based applications, according to an embodiment.

FIG. 2A shows a flowchart 2A00 that includes steps for setup and implementation of a disaster recovery capability for container-based applications. As an option, one or more variations of flowchart or any aspect thereof may be implemented in the context of the architecture and functionality of the embodiments described herein. The flowchart or any aspect thereof may be implemented in any environment.

As shown, the flow includes setup operations 201, ongoing operations 221, and movement operations 241. The steps interoperate so as to facilitate moving a container-based application from a source HCl cluster to a target HCl cluster where the container-based application includes container-native data storage as well as HCl cluster storage data. The shown steps rely, at least in part, on establishment of a disaster recovery topology (step 202). Establishment of such a disaster recovery topology includes setting up two different layers of storage that are each configured differently as for (1) respective mechanisms for layer-specific storage capabilities, and as for (2) respective mechanisms to implement a disaster recovery. Strictly as one example, an HCl storage cluster data replication mechanism might be configured to copy data and metadata from a plurality of storage devices that constitute the storage pool of a source HCl cluster, whereas a container-based application replication mechanism might be configured to copy data and metadata from an executable container that is running on a node of the source HCl cluster.

On an ongoing basis (step 222) application layer information is replicated by maintaining an application metadata replication path that copies application metadata pertaining to the container-based application from a first computing infrastructure site to a second computing infrastructure site. Further, HCl layer information is replicated by maintaining a data storage replication path that copies storage data from a first HCl cluster of the first computing infrastructure site to a second HCl cluster at the second computing infrastructure site. This step is carried out on an ongoing basis, at least until such time as a signal or request or other indication is received, which signal or request or other indication describes aspects of when and how to move the at least one container-based application from the first computing infrastructure site to the second computing infrastructure site (step 242). The signal or request or other indication can be acted on by (1) instantiating a copy of the container-based application at the second computing infrastructure site, and (2) associating data of the second HCl cluster at the second computing infrastructure site with the instantiated copy of the container-based application at the second computing infrastructure site.

Figure 2B:
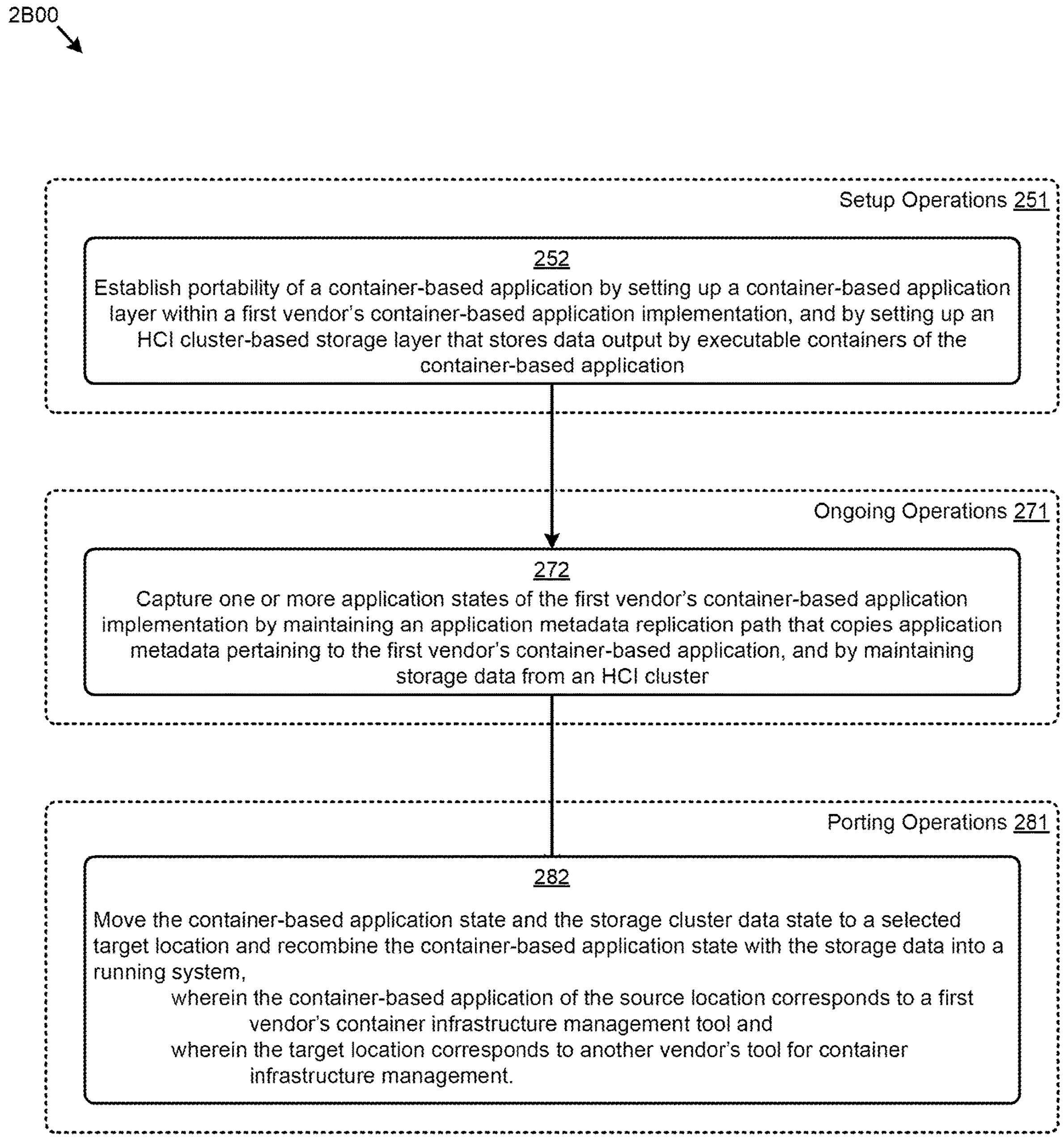
FIG. 2B shows a flowchart that includes steps for portability of container-based, HCl cluster-enabled applications, according to an embodiment.

FIG. 2B shows a flowchart 2B00 that includes steps for portability of container-based, HCl cluster-enabled application. As an option, one or more variations of flowchart or any aspect thereof may be implemented in the context of the architecture and functionality of the embodiments described herein. The flowchart or any aspect thereof may be implemented in any environment.

As shown, the flow includes setup operations 251, ongoing operations 271, and porting operations 281. The steps interoperate so as to facilitate porting of a container-based application from a first vendor's implementation to a second vendor's implementation. The shown steps rely, at least in part, on establishment of an application layer that supports portability (step 252). Establishment of such an application layer includes setting up a container-based application layer within a first vendor's container-based application implementation, and by setting up an HCl cluster-based storage layer that stores data output by executable containers of the container-based application.

On an ongoing basis, application states are replicated over an application metadata replication path that copies application metadata pertaining to the first vendor's container-based application to another location. Also on an ongoing basis, storage data from an HCl cluster is replicated to another location (step 272). This can be carried out until such time as a signal or request or other indication to move the first vendor's container-based application to another location that supports a second vendor's container-based application implementation. The signal or request or other indication to perform the move can be acted on by moving the container-based application state and the storage cluster data state from the source location to a selected target location, and then recombing the container-based application state with the HCl cluster storage data into a running system (step 282). In exemplary cases, the container-based application of the source location supports a first vendor's container infrastructure management tool (e.g., Kubernetes) and the target location supports another vendor's tool for container infrastructure management (e.g., Docker).

Figure 3A:
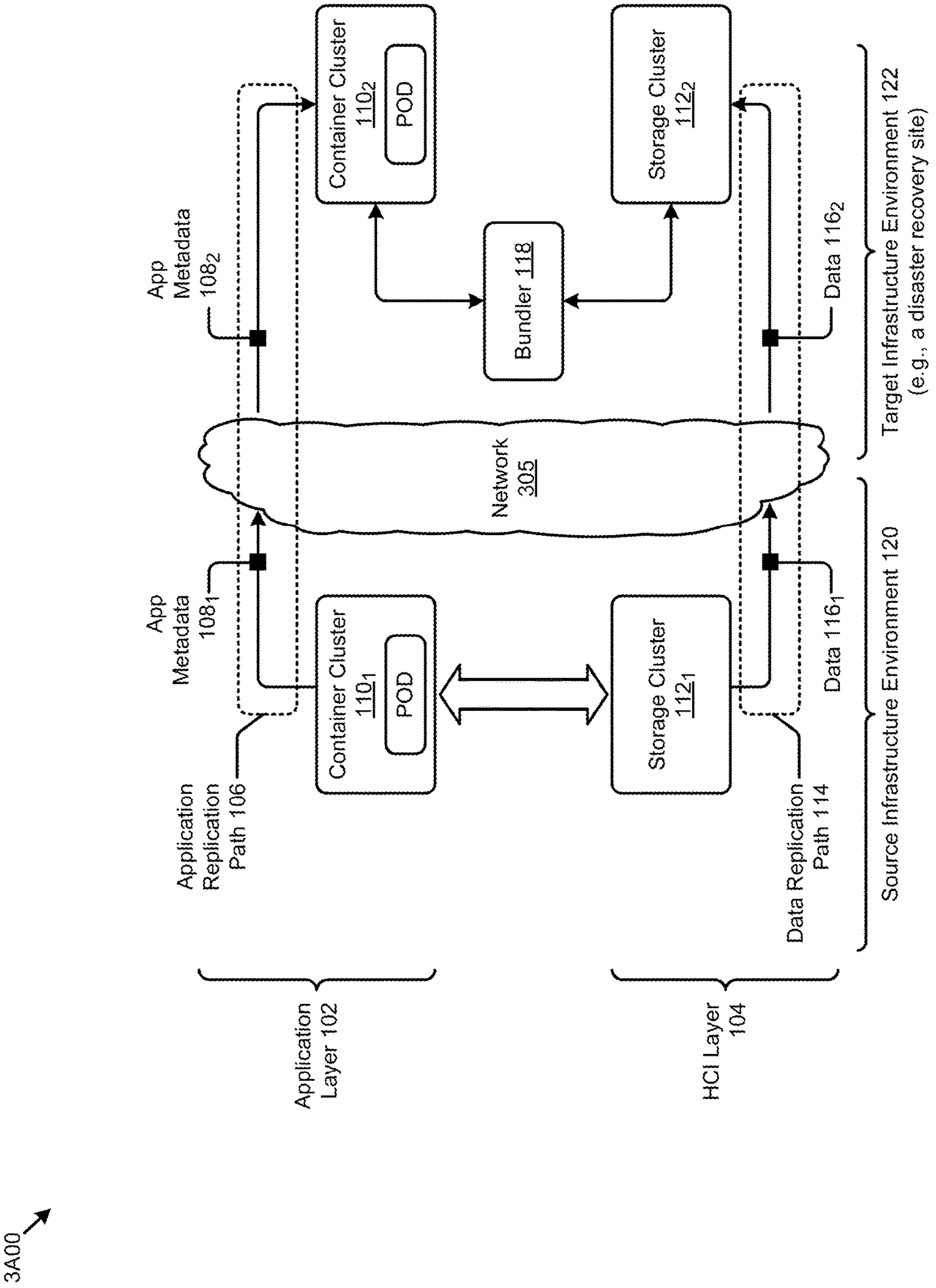
FIG. 3A depicts an active-active disaster recovery system architecture that is used to implement a disaster recovery capability for container-based applications, according to an embodiment.

FIG. 3A depicts an active-active disaster recovery system architecture 3A00 that is used to implement a disaster recovery capability for container-based applications. As an option, one or more variations of the architecture or any aspect thereof may be implemented in the context of the architecture and functionality of the embodiments described herein. The disaster recovery system architecture or any aspect thereof may be implemented in any environment.

This figure is being presented to illustrate how two different replication paths can operate concurrently so as to replicate data from a running system on a first infrastructure (e.g., source infrastructure environment 120) onto a running system of a second system (e.g., target infrastructure environment 122) in a live active-active disaster recovery topology.

As shown the application replication path 106 and the data replication path 114 are used to move application metadata and storage cluster data from a source infrastructure environment 120 to a target infrastructure environment 122. The source infrastructure environment 120 communicates with the target infrastructure environment 122, over network 305. Upon a signal (e.g., a restore signal raised for the purpose of recovery from a disaster), the bundler 118 can access the container-based application state and the storage cluster data state so as to recombine the two states into a running system in the target infrastructure environment 122.

Such an active-active disaster recovery topology has many advantages with respect to meeting recovery point objectives and recovery time objectives. However, the shown active-active disaster recovery topology is just one possibility. Other topologies that involve a backup system that is situated between a source infrastructure environment and a target infrastructure environment are shown and described as pertains to FIG. 3B and FIG. 3C.

Figure 3B:
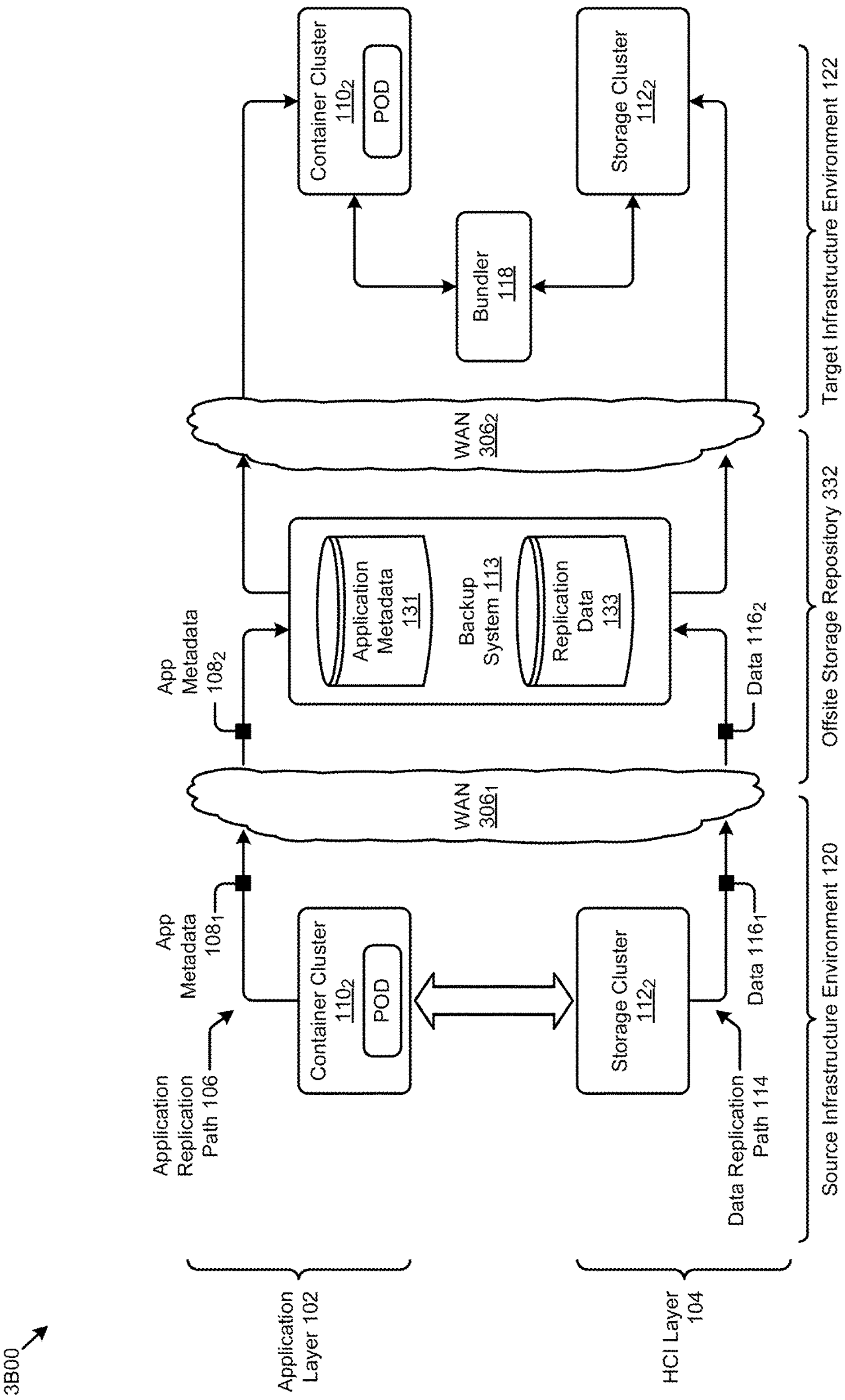
FIG. 3B depicts a backup system that is used to implement a backup and restore capability for container-based applications, according to an embodiment.

FIG. 3B depicts a backup system that is used to implement a backup and restore capability for container-based applications. As an option, one or more variations of backup and restore system architecture 3B00 or any aspect thereof may be implemented in the context of the architecture and functionality of the embodiments described herein. The backup and restore system architecture or any aspect thereof may be implemented in any environment.

As shown, the application replication path 106 and the data replication path 114 are used to move application metadata and storage cluster data from a source infrastructure environment 120 to an offsite storage repository 332. The source infrastructure environment 120 communicates with the target infrastructure environment 122 over a first WAN 3061 to backup system 113. As such, upon a signal (e.g., a restore signal raised for the purpose of recovery from a disaster), the bundler 118 can access the stored application metadata 131 of the backup system 113 as well as the replication data of the backup system 113, and can then recombine the data of the backup system 113 into a running system in the target infrastructure environment 122.

As shown, some portion of the application replication path 106 can be used by the container cluster $110_2$ and some portion of the data replication path 114 can be used by the storage cluster $112_2$. Additionally or alternatively, some portion of the application replication path 106 can be used by the bundler 118 as well as some portion of the data replication path 114 can be used by the bundler 118.

Figure 3C:
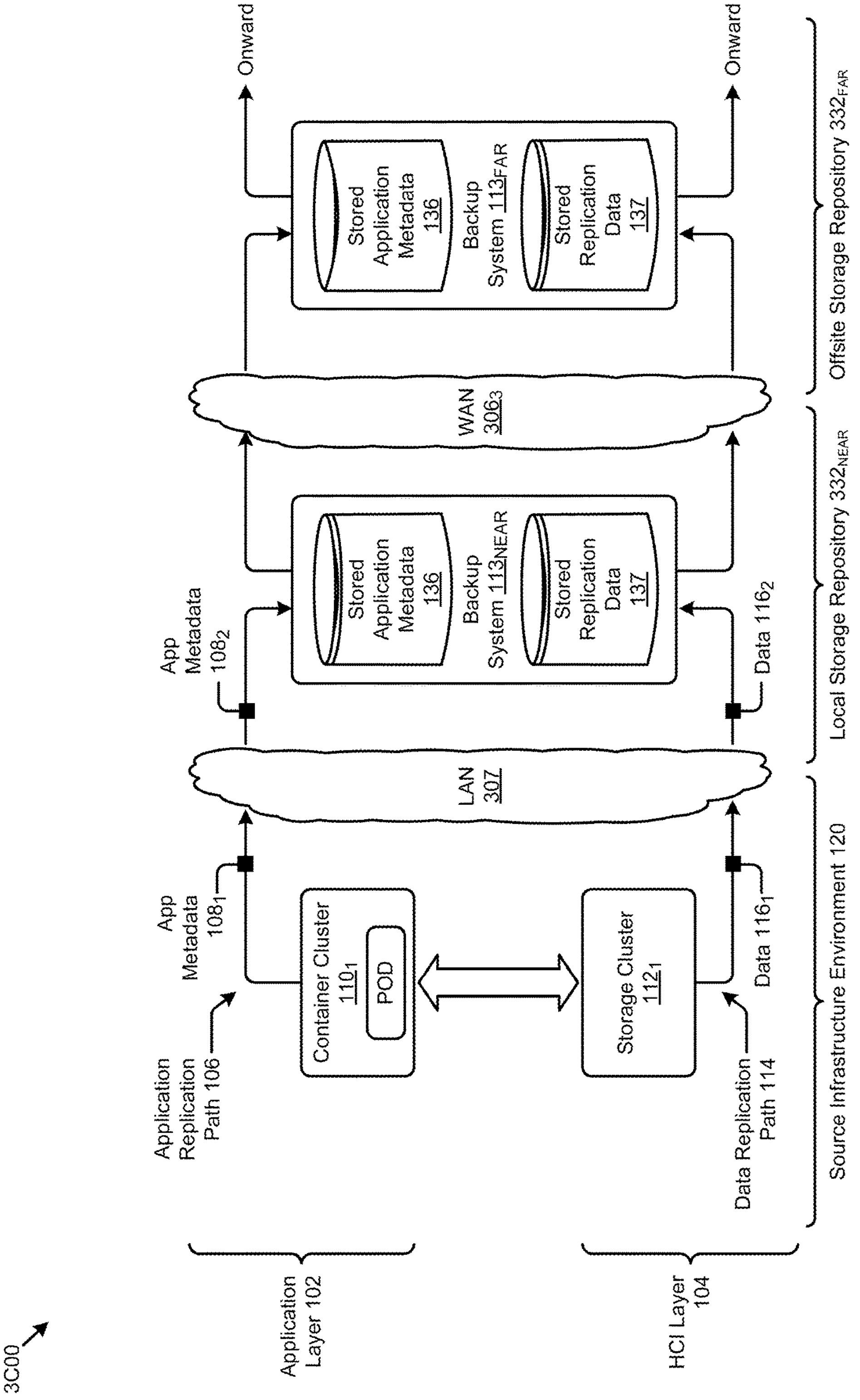
FIG. 3C depicts a hybrid backup and restore system architecture that is used to implement a near/far backup and restore capability for container-based applications, according to an embodiment.

FIG. 3C depicts a hybrid backup and restore system architecture 3C00 that is used to implement a near/far backup and restore capability for container-based applications. As an option, one or more variations of hybrid backup and restore system architecture or any aspect thereof may be implemented in the context of the architecture and functionality of the embodiments described herein. The hybrid backup and restore system architecture or any aspect thereof may be implemented in any environment.

As shown, the application replication path 106 and the data replication path 114 are used to move application metadata and storage cluster data from a source infrastructure environment 120 to an local storage repository $332_{NEAR}$. The source infrastructure environment 120 communicates with the local storage repository $332_{NEAR}$ over a LAN 307. Upon a signal (e.g., a replication signal raised for the purpose of pre-positioning data for recovery from a disaster), the backup system $113_{FAR}$ or its agents in the offsite storage repository $332_{FAR}$ can carry out a network protocol over the WAN 3063 to retrieve the stored application metadata 136 of the backup system $113_{NEAR}$ as well as the stored replication data 137 of the backup system $113_{NEAR}$.

Figure 3D:
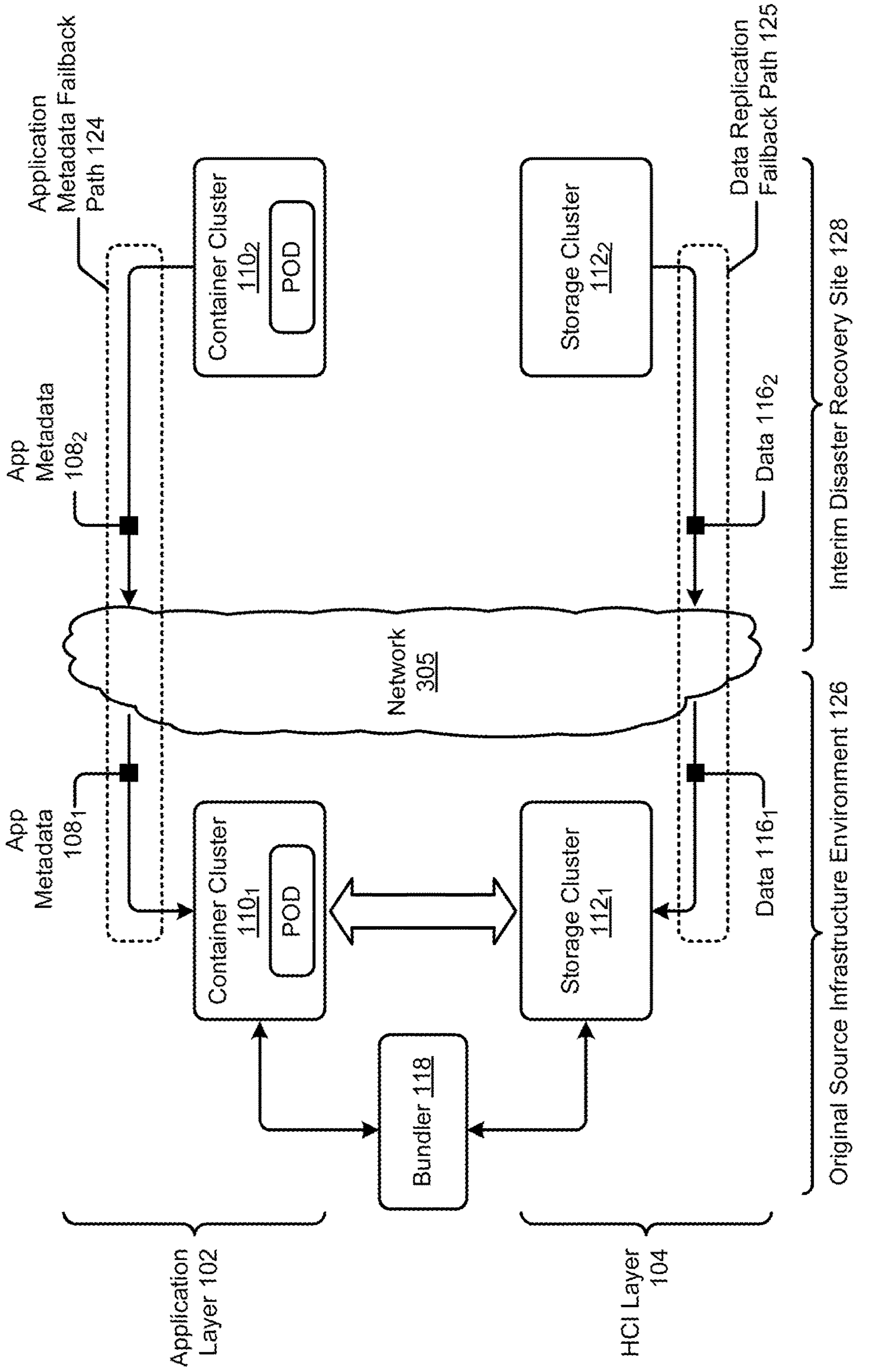
FIG. 3D depicts a system restore technique used for implementing a restore capability for container-based applications, according to an embodiment.

FIG. 3D depicts a system restore technique used for implementing a restore capability for container-based applications. As an option, one or more variations of system restore technique or any aspect thereof may be implemented in the context of the architecture and functionality of the embodiments described herein. The system restore technique or any aspect thereof may be implemented in any environment.

As shown, the application metadata failback path 124 and the data replication failback path 125 are used to move application metadata and storage cluster data from an interim disaster recovery site 128 to an original source infrastructure environment 126. The bundler 118 of the original source infrastructure environment 126 can be used recombine the data received over the data replication failback path 125 and the app metadata received over the application metadata failback path 124 into a running system at the original source infrastructure environment 126.

Figure 4:
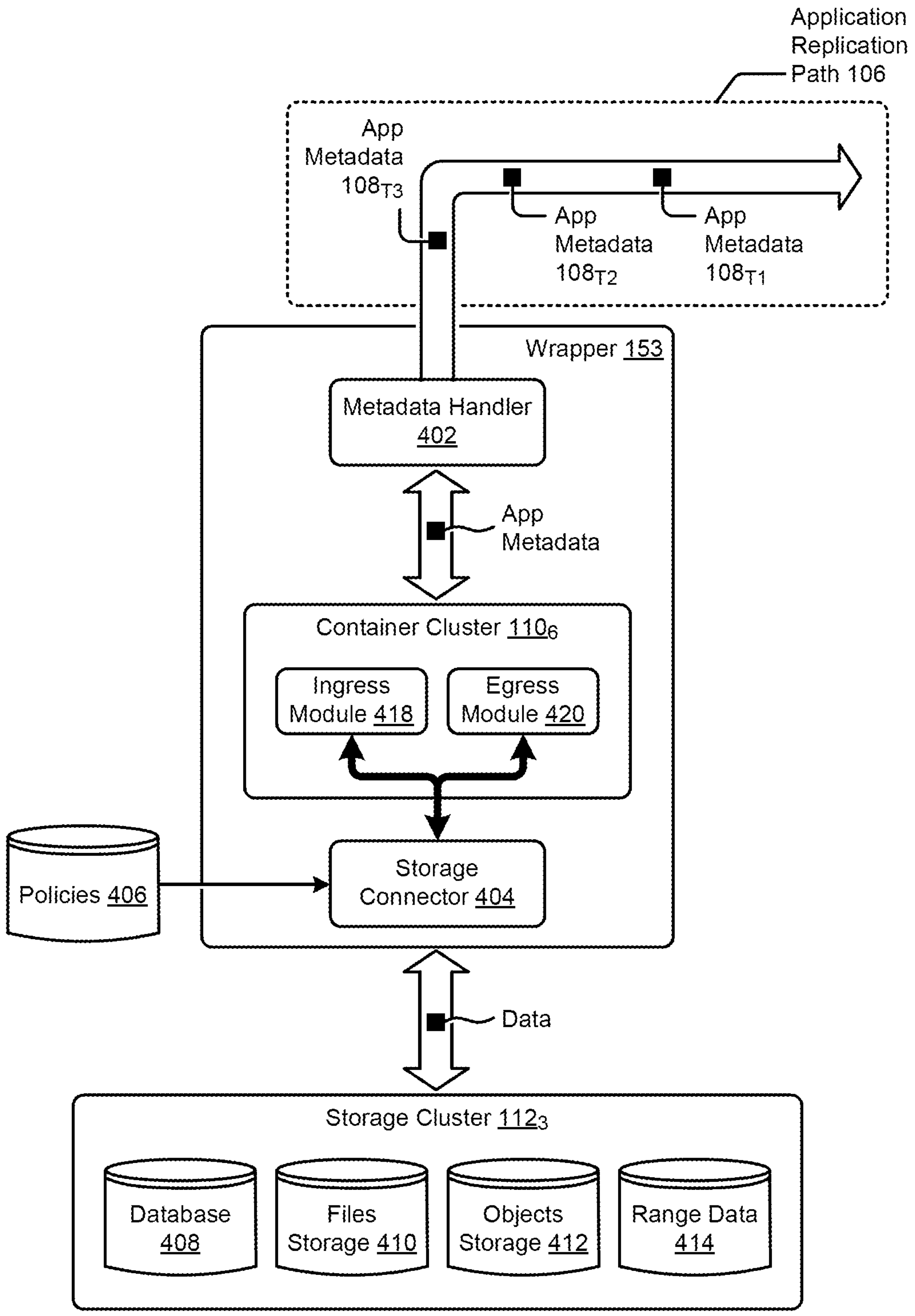
FIG. 4 exemplifies a policy-driven storage model used to implement a disaster recovery capability for container-based applications, according to an embodiment.

FIG. 4 exemplifies a policy-driven storage model used to implement a disaster recovery capability for container-based applications. As an option, one or more variations of policy-driven storage model or any aspect thereof may be implemented in the context of the architecture and functionality of the embodiments described herein. The policy-driven storage model or any aspect thereof may be implemented in any environment.

As shown, the policies 406 inform a storage connector 404 via communication through wrapper 153. The storage connector in turn interfaces with an ingress module 418 and a egress module 420 of a container cluster so as to modify incoming and outgoing data that is used by both the application(s) of the container cluster as well as the different types of storage of the storage cluster 1123. In this example embodiment, the storage cluster 1123 can maintain many different types of data. Specifically, strictly as examples, the storage cluster 1123 can maintain a database 408, files storage 410, objects storage 412, and range data 414. As used herein, range data refers to any storage of information that is accessible by a name or key or other identifier that is assigned uniquely to a position in a contiguous address space.

In the shown embodiment, wrapper 153 includes a metadata handler 402, which metadata handler is configured to communicate application metadata over the application replication path 106 on a periodic, ongoing basis. As shown, the metadata handler can capture application metadata at any moment in time. Specifically, the metadata handler can capture a first set of application metadata at a first time (e.g., app metadata $108_{T1}$), a second set of application metadata at a second time (e.g., app metadata $108_{T2}$), a third set of application metadata at a third time (e.g., app metadata $108_{T3}$), and so on. The specific timing of when application metadata is captured can be based, at least in part on a policy (e.g., pertaining to a recovery time objective or other service level agreement value). In some cases, the specific timing of when application metadata is captured is based the timing of when an underlying application is in a quiescent state and/or application-consistent state.

The container cluster 1106 can include multiple types of applications and/or multiple layers of applications. For example, container cluster 1106 might refer to a web layer that handles user I/O, as well as a logic layer that sits between the web layer and a database layer. The container cluster 1106 might further include caching layer that sits between the logic layer and the database layer. The foregoing is merely an example, and any variations of application layering are possible.

Figure 5A:
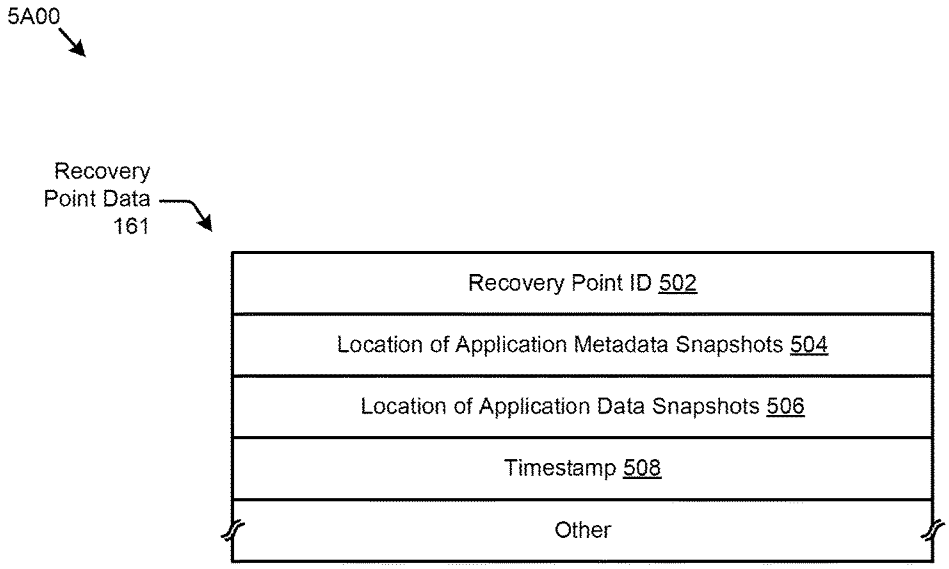
FIG. 5A exemplifies a recovery point data payload structure as used to implement a disaster recovery capability for container-based applications, according to an embodiment.

FIG. 5A exemplifies a recovery point data payload structure 5A00 as used to implement a disaster recovery capability for container-based applications. As an option, one or more variations of recovery point data payload structure or any aspect thereof may be implemented in the context of the architecture and functionality of the embodiments described herein. The recovery point data payload structure or any aspect thereof may be implemented in any environment.

The recovery point data payload structure 5A00 is being presented merely to present one possible organization of data that is used to describe attributes of a recovery point and/or to identify data items that are used in the context of recovery operations. As shown, a particular recovery task may be identified by a recovery point ID 502, which can be used to refer to a full set of attributes of a recovery point and/or to identify data items that are used in the context of the particular recovery task. In this example, recovery point data 161 includes a location of application metadata snapshots 504, a location of application data snapshots 506, and a timestamp 508 that refers to a time that the snapshots refer to.

Figure 5B:
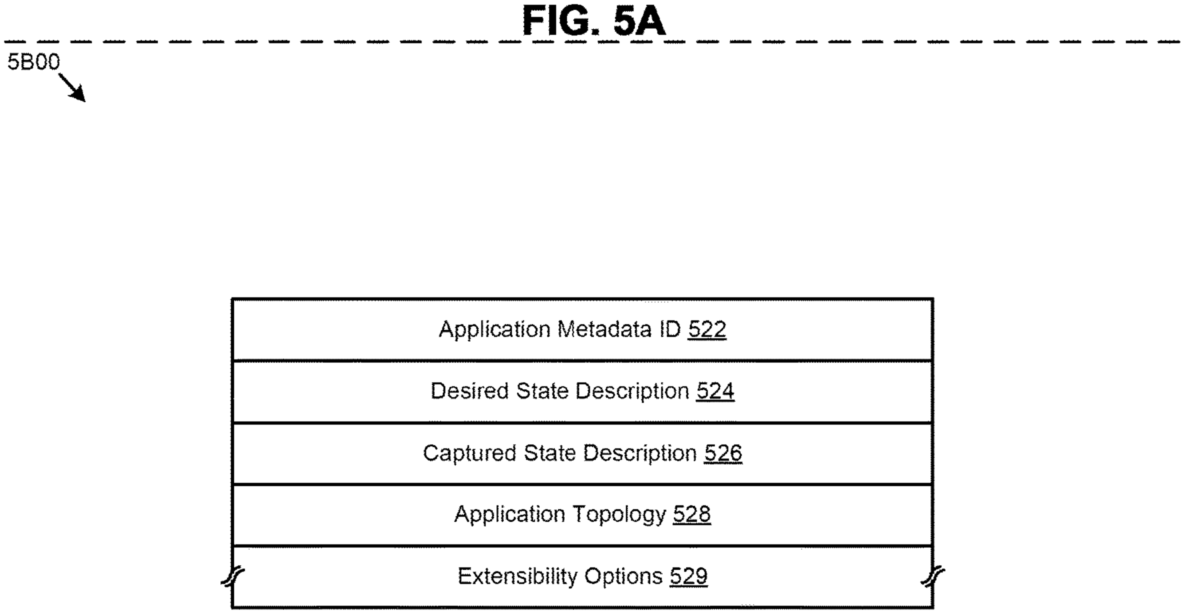
FIG. 5B exemplifies an application metadata payload structure as used to implement a disaster recovery capability for container-based applications, according to an embodiment.

FIG. 5B exemplifies an application metadata payload structure 5B00 as used to implement a disaster recovery capability for container-based applications. As an option, one or more variations of application metadata payload structure or any aspect thereof may be implemented in the context of the architecture and functionality of the embodiments described herein. The application metadata payload structure or any aspect thereof may be implemented in any environment.

The shown application metadata payload, referred to by application metadata ID 522 is merely one example of an organization of data that can be used to bring a containerized application to a desired state based on a captured state description 526 and knowledge of the application topology 528. For example, a particular recovery task might require bringing up a containerized application into a target infrastructure (e.g., based on desired state description 524), where the containerized application is brought up from a particular set of snapshots (e.g., based on captured state description 526).

The steps needed to accomplish such a recovery task might demand knowledge of the application topology. For example, a master application might be implemented in a topology where there are many slave applications. In some cases a topology can be referred-to or defined by the contents of the application topology data item. In other cases, a topology can be known by virtue of knowing the name of a vendor, or by knowing the name of the vendor's container infrastructure management tool. In some cases, the application topology field might refer to a values.yaml file that can contain ongoing and default values that in turn may refer to specific containers, and/or specific versions of any of the constituents of the application. The shown application metadata payload structure 5B00 is extensible with additional fields (extensibility options 529) so as to facilitate coverage of additional vendors and/or their particular organizations or topologies of their containerized applications.

As shown, extensibility options 529 relate to one or more of: (1) extensibility that may be provided by different vendors of containers, and/or (2) extensibility that may be provided by vendors of the HCl storage clusters. The application topology 528 may refer to an application hierarchy and/or access to application metadata via specific ports. Further, a desired state description may include a preferred mechanism for recovery, including but not limited to recovery from a base state (e.g., start from "scratch"), or recovery from an incremental state (e.g., a state defined by the state of the replication data and/or any particular application state as may have been saved during execution of the application). In some cases, the desired state description refers to a function or API that is executed so as to gather then current information about the target environment.

Figure 5C:
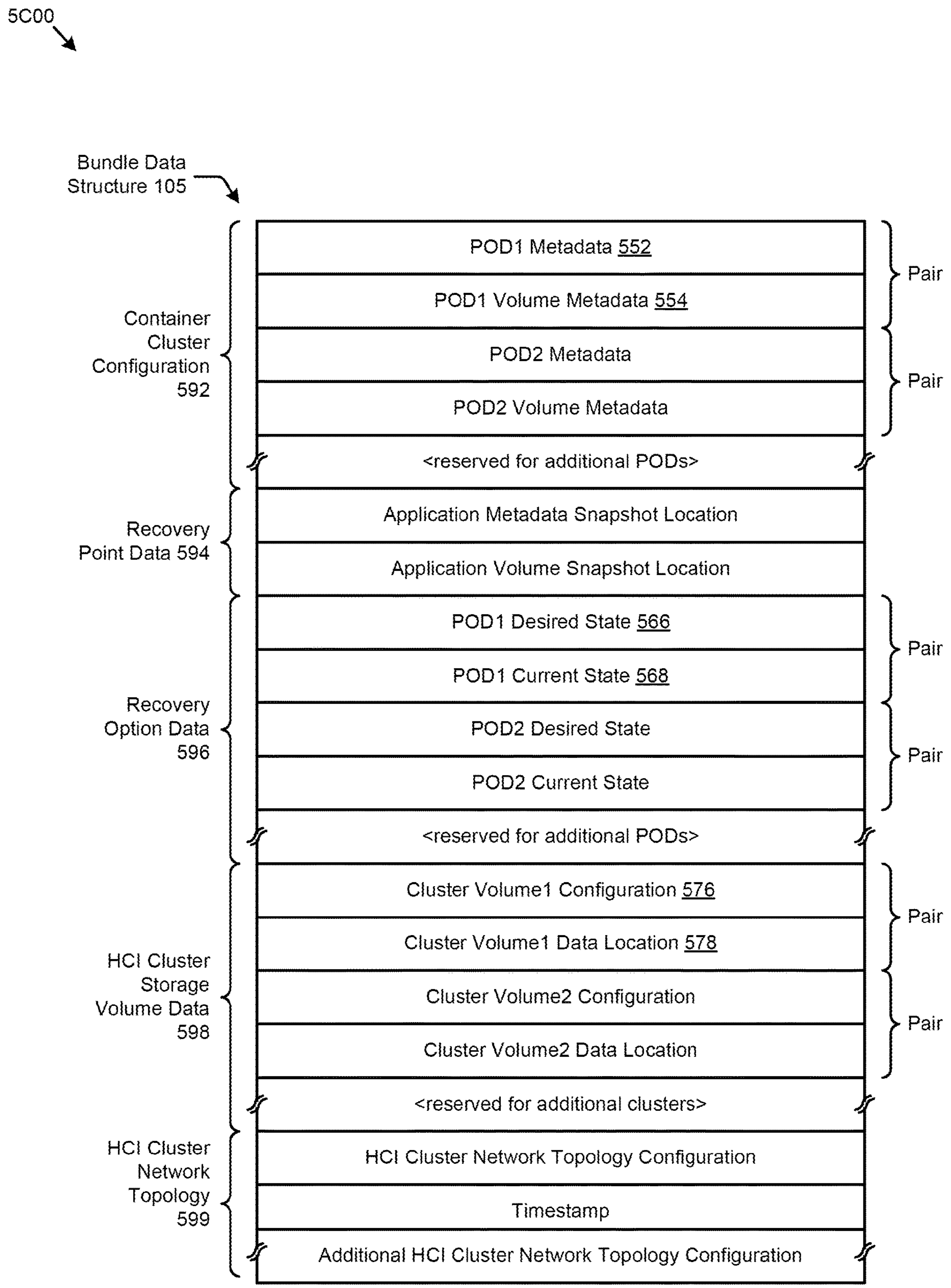
FIG. 5C is a bundle data structure diagram showing an example bundle data structure as used to implement a disaster recovery capability for container-based applications, according to an embodiment.

FIG. 5C is a bundle data structure diagram 5C00 showing an example bundle data structure as used to implement a disaster recovery capability for container-based applications. As an option, one or more variations of bundle data structure or any aspect thereof may be implemented in the context of the architecture and functionality of the embodiments described herein. The bundle data structure or any aspect thereof may be implemented in any environment.

The figure is being presented to illustrate one possible organization of data items that are used to relate multiple instances of container cluster snapshot data (e.g., corresponding to a particular point in time), to corresponding multiple instances of HCl cluster storage volume snapshots. More particularly, the figure is being presented to illustrate how data can be organized to be able to relate a container cluster configuration (e.g., the shown container cluster configuration 592) with HCl data (e.g., the shown HCl cluster storage volume data 598) so as to facilitate a bring-up of a container-based application or cluster to a particular state (e.g., as depicted by recovery point data 594). In some cases, aspects of an HCl cluster network topology 599 are codified as data items in the bundle data structure. Information included in the HCl cluster network topology data items can be used to re-situate the container-based application and its storage at a target. More specifically, the HCl cluster network topology can be used to formulate differences between the HCl cluster network topology at the source (e.g., which HCl cluster network topology at the source was then-current as of the timestamp) with any discovered HCl cluster network topology at the target. The formulated differences can in turn be used to configure the container-based application into the network of the target HCl cluster.

Strictly as an additional example of usage of the bundle data structure, the bundle data structure can logically pair data comprising application metadata (e.g., POD1 metadata 552) with identification of the application's storage volume data (e.g., POD1 volume metadata 554). Additionally, another logical pair can refer to that application's (e.g., POD1's) bring-up information (e.g., the shown POD1 desired state 566) and that application's current state (e.g., POD1 current state 568). Such pairs can be stored as recovery option data 596 segment of the bundle data structure.

Furthermore, yet another logical pair can be used to provide a correspondence between an occurrence of HCl cluster storage volume metadata (e.g., shown as cluster volume1 configuration 576) and that volume's location (e.g., shown as cluster volume1 data location 578).

Figure 6A:
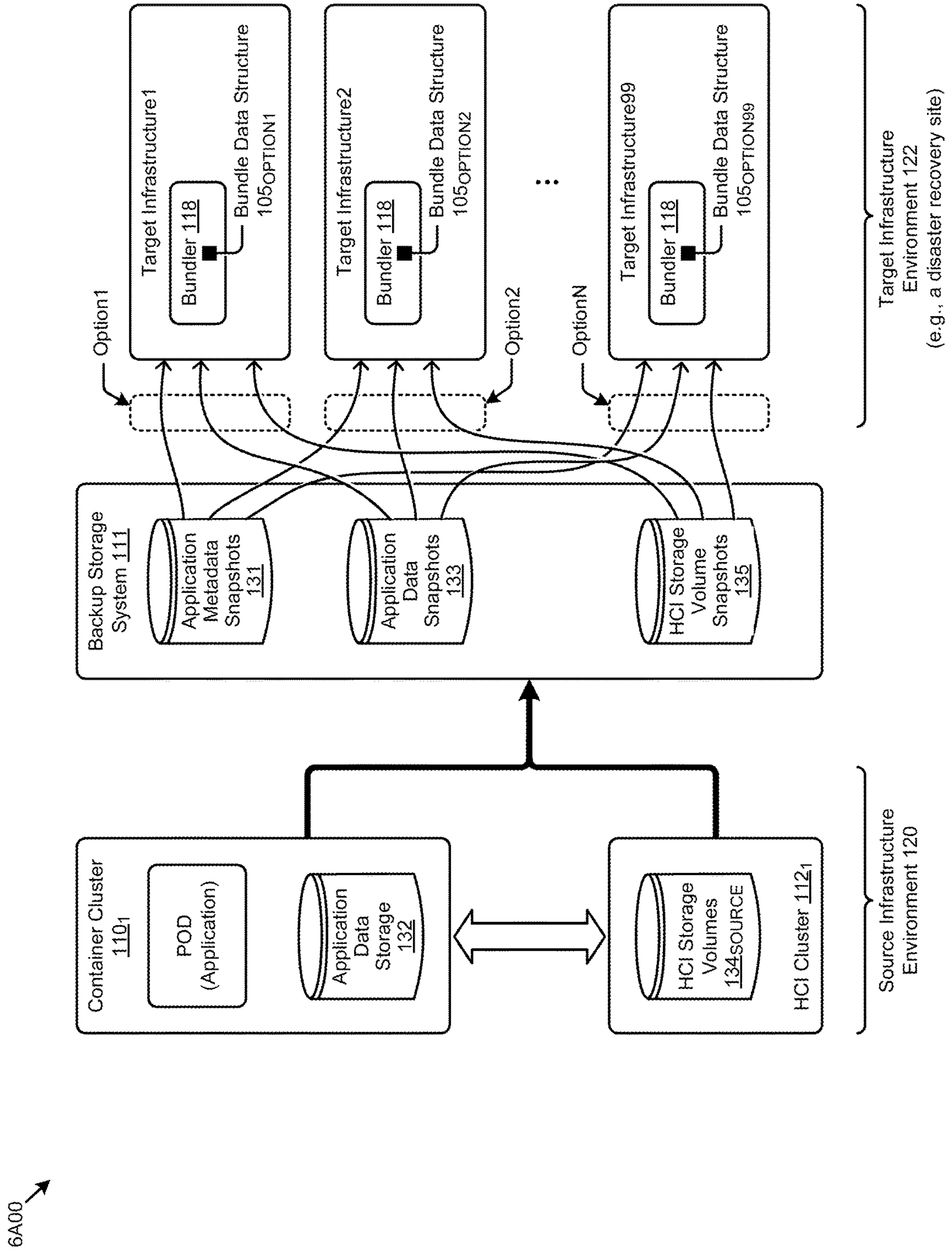
FIG. 6A exemplifies a first portability architecture as used to implement a disaster recovery capability for container-based applications, according to an embodiment.

FIG. 6A exemplifies a first portability architecture 6A00 as used to implement a disaster recovery capability for container-based applications. As an option, one or more variations of first portability architecture or any aspect thereof may be implemented in the context of the architecture and functionality of the embodiments described herein. The first portability architecture or any aspect thereof may be implemented in any environment.

The figure is being presented to explain how the state(s) of a computing system can be ported to a particular target infrastructure. Specifically the figure shows how the state(s) of a computing system can be stored in a backup storage facility, and then, at a later moment in time, the state(s) of the computing system can be reconstituted into a running system on particular target infrastructure. The particular target infrastructure can be selected as an option that is determined at the later moment in time.

In this example, and as shown, outputs of a container cluster and outputs of an HCl cluster are stored at a backup storage facility (e.g., backup storage 111). Specifically, the outputs of container cluster and outputs of an HCl cluster include application metadata snapshots 131, application data snapshots 133 and HCl storage volume snapshots 135. Such outputs are stored, and possibly updated periodically in the backup storage facility until such time as a signal is raised to recombine the outputs into a running system.

A running system can be formed on any of a variety of computing infrastructure choices. The foregoing signal may include an indication of a particular one of the computing infrastructure choices (e.g., option1, option2, option) corresponding to particular computing infrastructure (e.g., target infrastructure1, target infrastructure2, target infrastructure99). A bundler 118 is situated within the target infrastructure. The bundler of a particular target infrastructure or it agents may bring-up a container cluster and an HCl cluster into a state that corresponds to a point in time that is covered by the foregoing snapshots. More particularly, a bundle data structure may be configured to relate container cluster snapshot data (e.g., corresponding to a particular point in time), to a HCl cluster storage volume snapshots (e.g., corresponding to the same particular point in time). A particular bundle data structure (e.g., bundle data structure $\mathbf{105}_{OPTION1}$, bundle data structure $\mathbf{105}_{OPTION2}$, bundle data structure $\mathbf{105}_{OPTION99}$) is used by infrastructure management tools at the target infrastructure.

In some architectures, infrastructure management tools at the target infrastructure are divided into (1) container infrastructure management tools and (2) storage cluster infrastructure management tools. In some architectures, the target infrastructure is a public computing cloud. An example of such an architecture is shown and described as pertains to FIG. 6B.

Figure 6B:
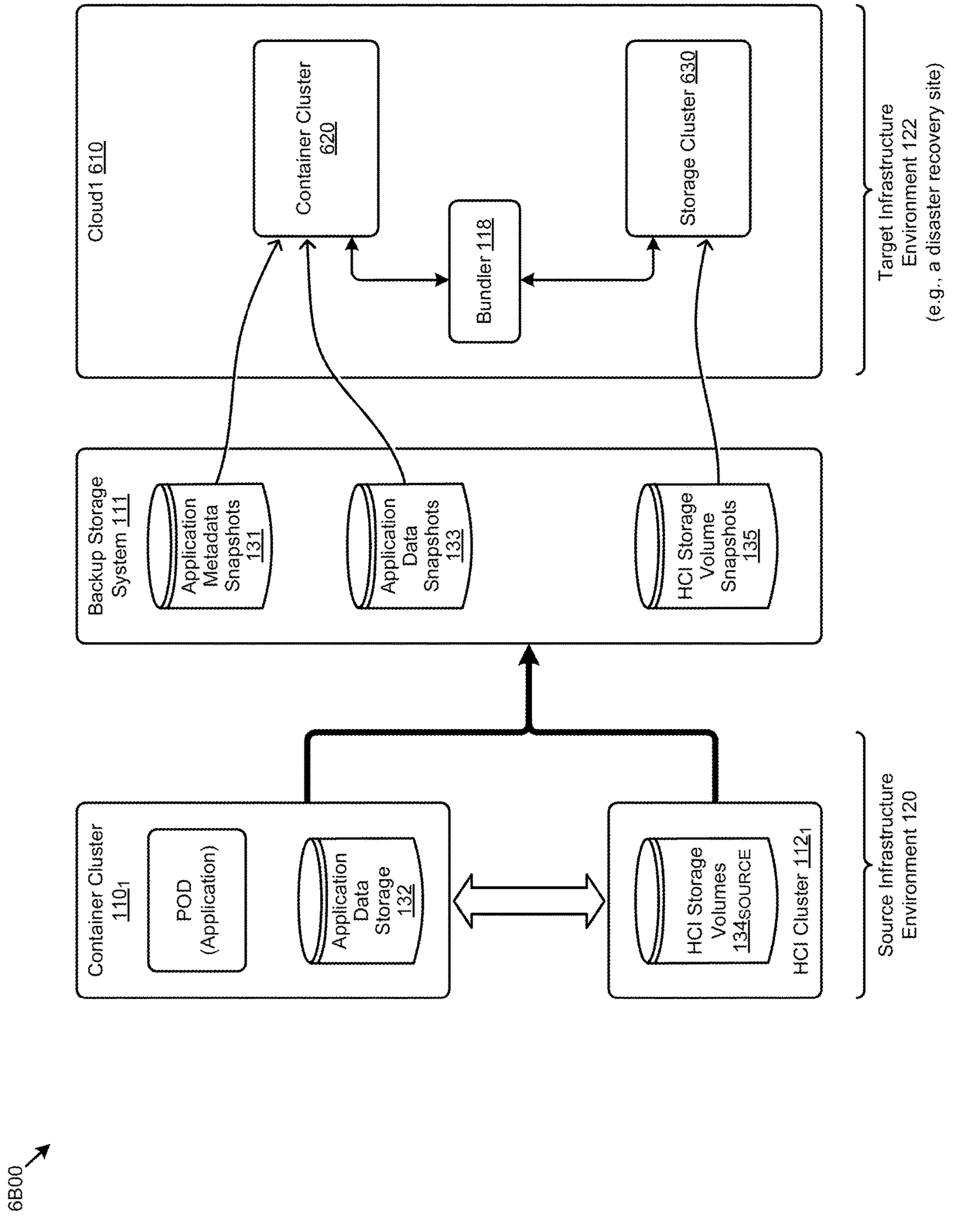
FIG. 6B exemplifies a second portability architecture as used to implement a disaster recovery capability for container-based applications, according to an embodiment.

FIG. 6B exemplifies a second portability architecture 6B00 as used to implement a disaster recovery capability for container-based applications. As an option, one or more variations of second portability architecture or any aspect thereof may be implemented in the context of the architecture and functionality of the embodiments described herein. The second portability architecture or any aspect thereof may be implemented in any environment.

As shown, application metadata snapshots 131 and application data snapshots 133 are brought into a cloud infrastructure (e.g., cloud 610), specifically into container cluster 620. Similarly, HCl volume snapshots are brought into storage cluster 630. A bundler 118 serves to relate container cluster snapshot data (e.g., application metadata snapshots 131 and application data snapshots 133), to HCl cluster storage volume snapshots 135, where the foregoing snapshots correspond to the same particular point in time).

The foregoing portability options refer to re-configuring a running system from a collection of backup snapshots. However, in some situations, portability is facilitated by re-configuring a first running system into a second running system. This is shown and described as pertains to the portability architecture of FIG. 6C.

Figure 6C:
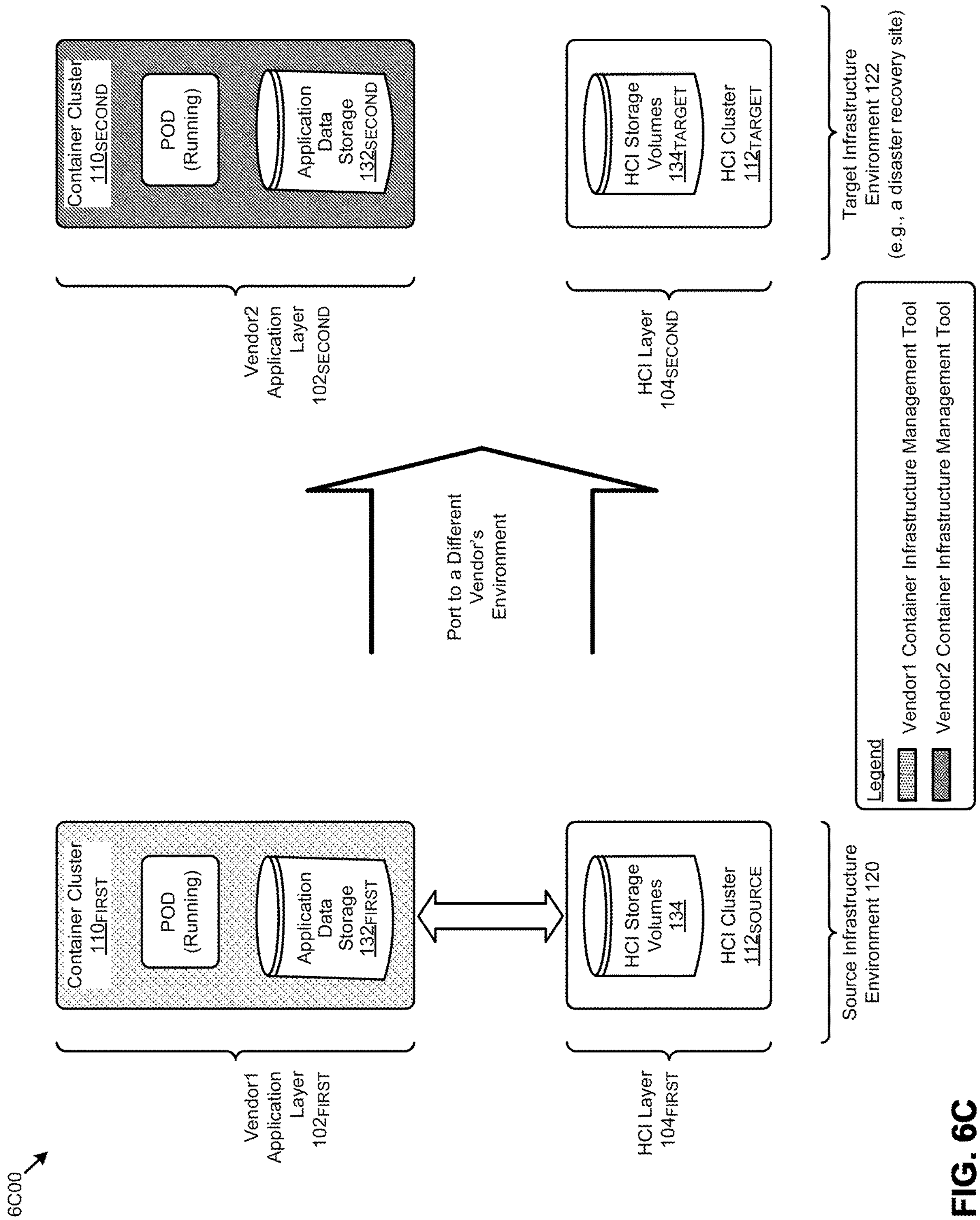
FIG. 6C exemplifies a third portability architecture as used to implement a disaster recovery capability for container-based applications, according to an embodiment.

FIG. 6C exemplifies a third portability architecture 6C00 as used to implement a disaster recovery capability for container-based applications. As an option, one or more variations of third portability architecture or any aspect thereof may be implemented in the context of the architecture and functionality of the embodiments described herein. The third portability architecture or any aspect thereof may be implemented in any environment.

As shown, the environment includes multiple vendors. More specifically, the figure shows how a first running POD under the regime of a first vendor's container infrastructure management tool can be ported to second running POD under the regime of a second vendor's container infrastructure management tool. Specifically, the POD (e.g., the POD of container cluster $\mathbf{110}_{FIRST}$) is ported to a different POD (e.g., the POD of container cluster $\mathbf{110}_{SECOND}$) and its and its application data storage $\mathbf{132}_{FIRST}$ is ported to application data storage $\mathbf{132}_{SECOND}$. The porting between the source infrastructure and the target infrastructure can be direct (as shown) as carried out directly between a vendor1's application layer $\mathbf{102}_{FIRST}$ and a vendor2's application layer $\mathbf{102}_{SECOND}$. In some cases, and as shown, the porting between source infrastructure environment 120 and the target infrastructure environment 122 can include porting of HCl storage volumes between a first HCl vendor's HCl cluster $\mathbf{112}_{SOURCE}$ in HCl layer $\mathbf{104}_{FIRST}$ and a second HCl vendor's HCl cluster $\mathbf{112}_{TARGET}$ in HCl layer $\mathbf{104}_{SECOND}$. Additionally, or alternatively, there can be an intermediate storage facility between the source infrastructure and the target infrastructure. The target infrastructure can be situated at any selected target location. Strictly as examples, the selected target location may be selected on the basis of a preferred vendor (e.g., based on a cloud vendor preference or based on a container infrastructure management tool preference, etc.). In some situations a selected target location may be selected on the basis of high-availability and/or security considerations (e.g., based on a geographic location, or a location that is within or outside of a political boundary location, or based on an availability zone, etc.).

When porting a container from a first vendor's container infrastructure management tool to a second vendor's container infrastructure management tool, the semantics of the first vendor's container infrastructure management tool is casted into the semantics of the second vendor's container infrastructure management tool. Furthermore, when porting HCl data from a first HCl vendor's HCl cluster to a second HCl vendor's HCl cluster, the semantics of the first HCl vendor's HCl cluster is casted into the semantics of the second HCl vendor's HCl cluster.

System Architecture Overview

Additional System Architecture Examples

All or portions of any of the foregoing techniques can be partitioned into one or more modules and instanced within, or as, or in conjunction with, a virtualized controller in a virtual computing environment. Some example instances within various virtual computing environments are shown and discussed as pertains to FIG. 7A, FIG. 7B, FIG. 7C, and FIG. 7D.

Figure 7A:
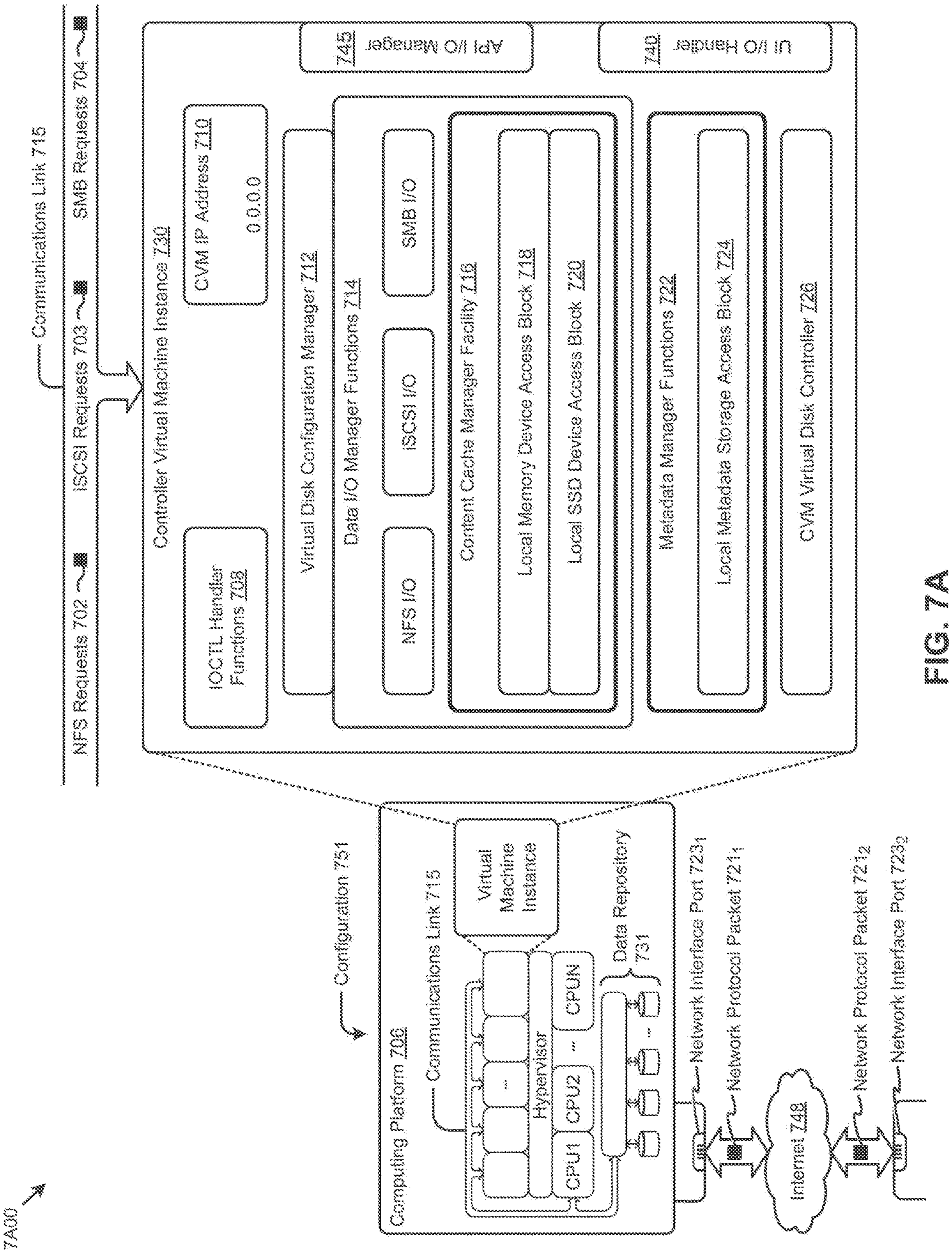
FIG. 7A, FIG. 7B, FIG. 7C, and FIG. 7D depict virtualization system architectures comprising collections of interconnected components suitable for implementing embodiments of the present disclosure and/or for use in the herein-described environments.

FIG. 7A depicts a virtualized controller as implemented in the shown virtual machine architecture 7A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $\mathbf{723}_1$ and network interface port $\mathbf{723}_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet 7212).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to handling application-consistent snapshots across execution environments. In some embodiments, a module may include one or more state machines and/or combinational logic used to implement or facilitate the operational and/or performance characteristics pertaining to porting application-consistent snapshots across execution environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of handling application-consistent snapshots across execution environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to handling application-consistent snapshots across execution environments, and/or for improving the way data is manipulated when performing computerized operations pertaining to binding intra-container parameters to an external storage cluster.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 7B:
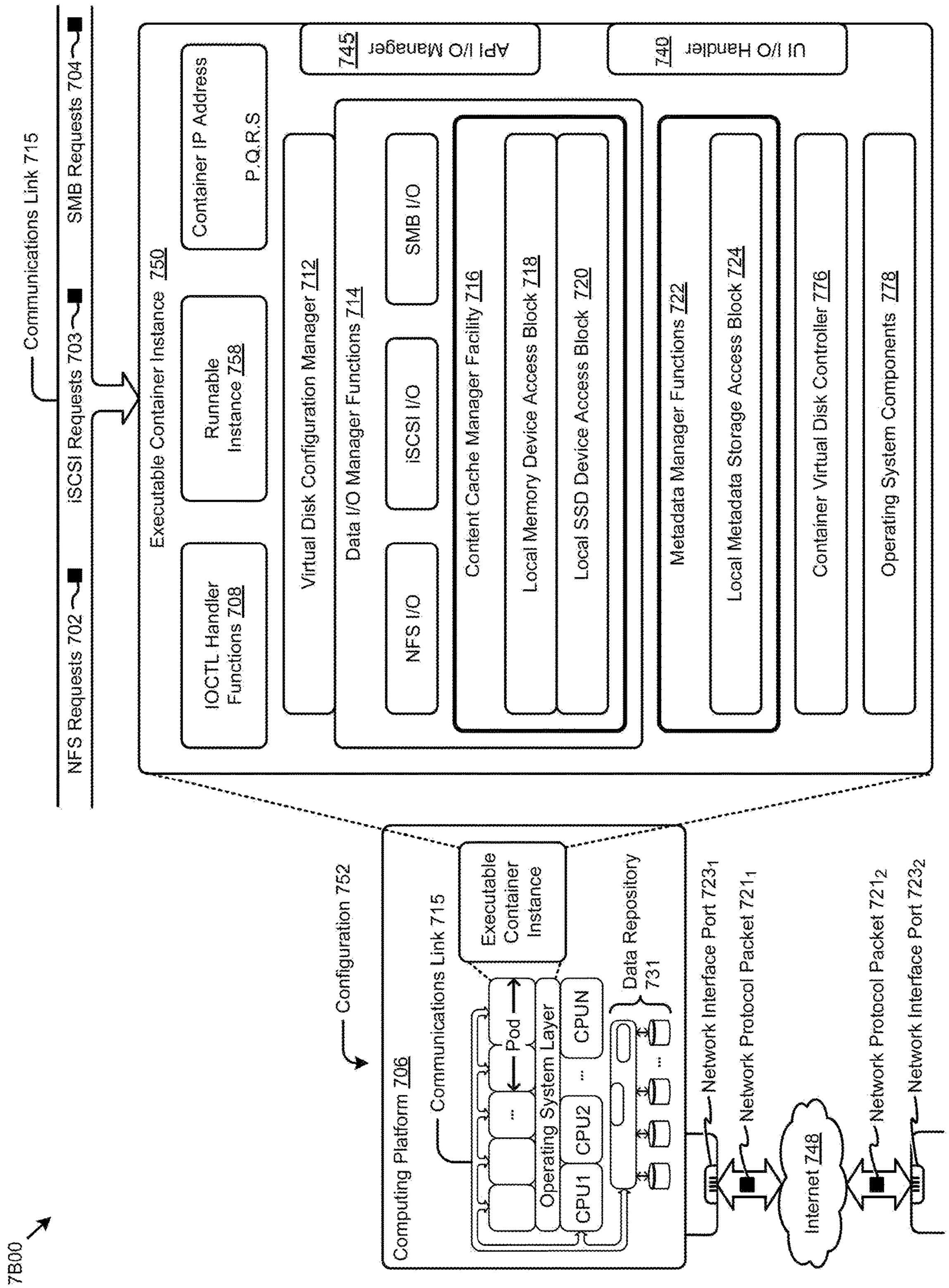

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
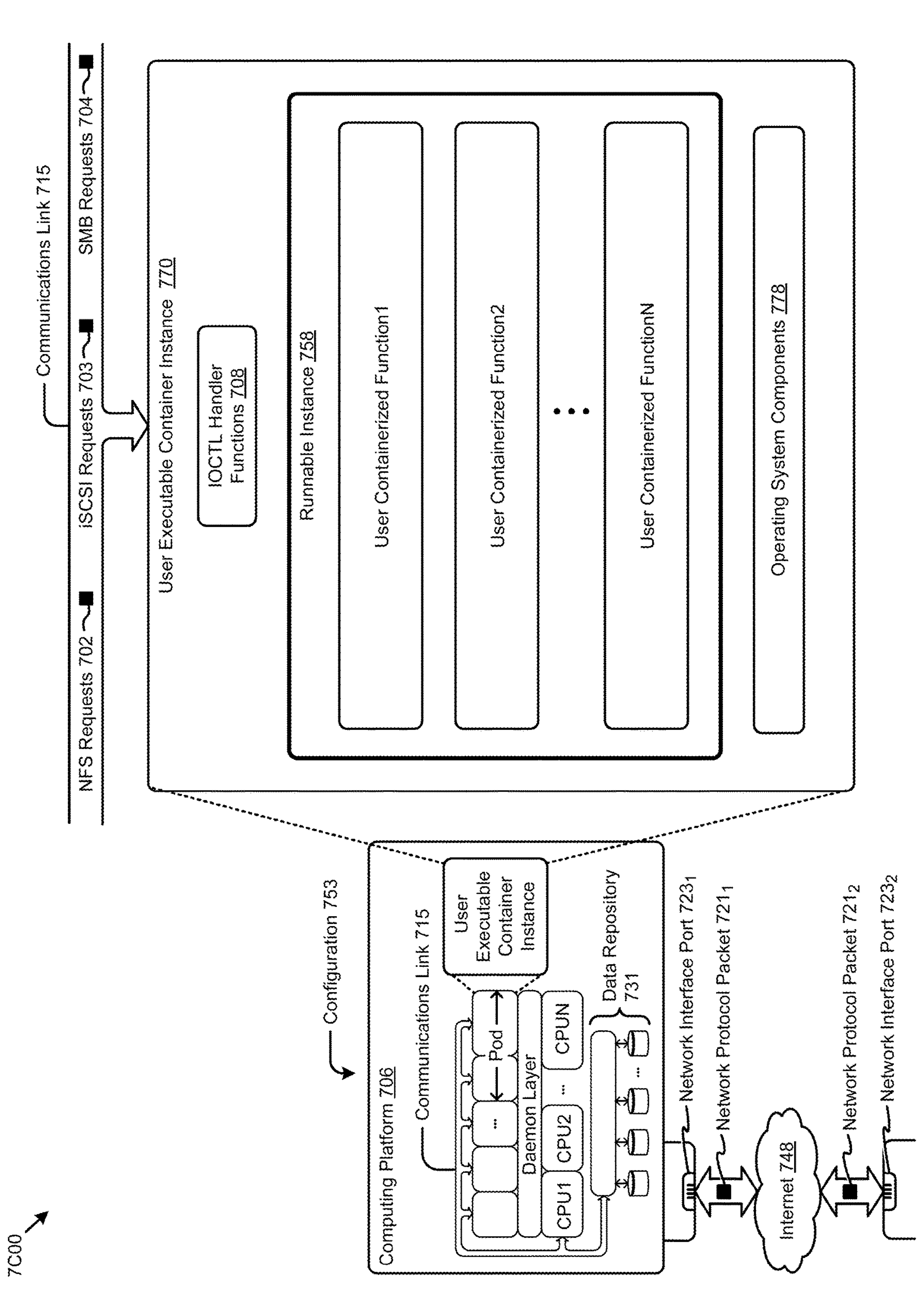

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 770. Configuration 753 includes a daemon layer (as shown) that performs certain functions of an operating system.

User executable container instance 770 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 770.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, possibly including both local storage (e.g., using node-internal storage devices) and any forms of network-accessible storage, are collected to form a storage pool having a contiguous address space formed of two or more address ranges.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
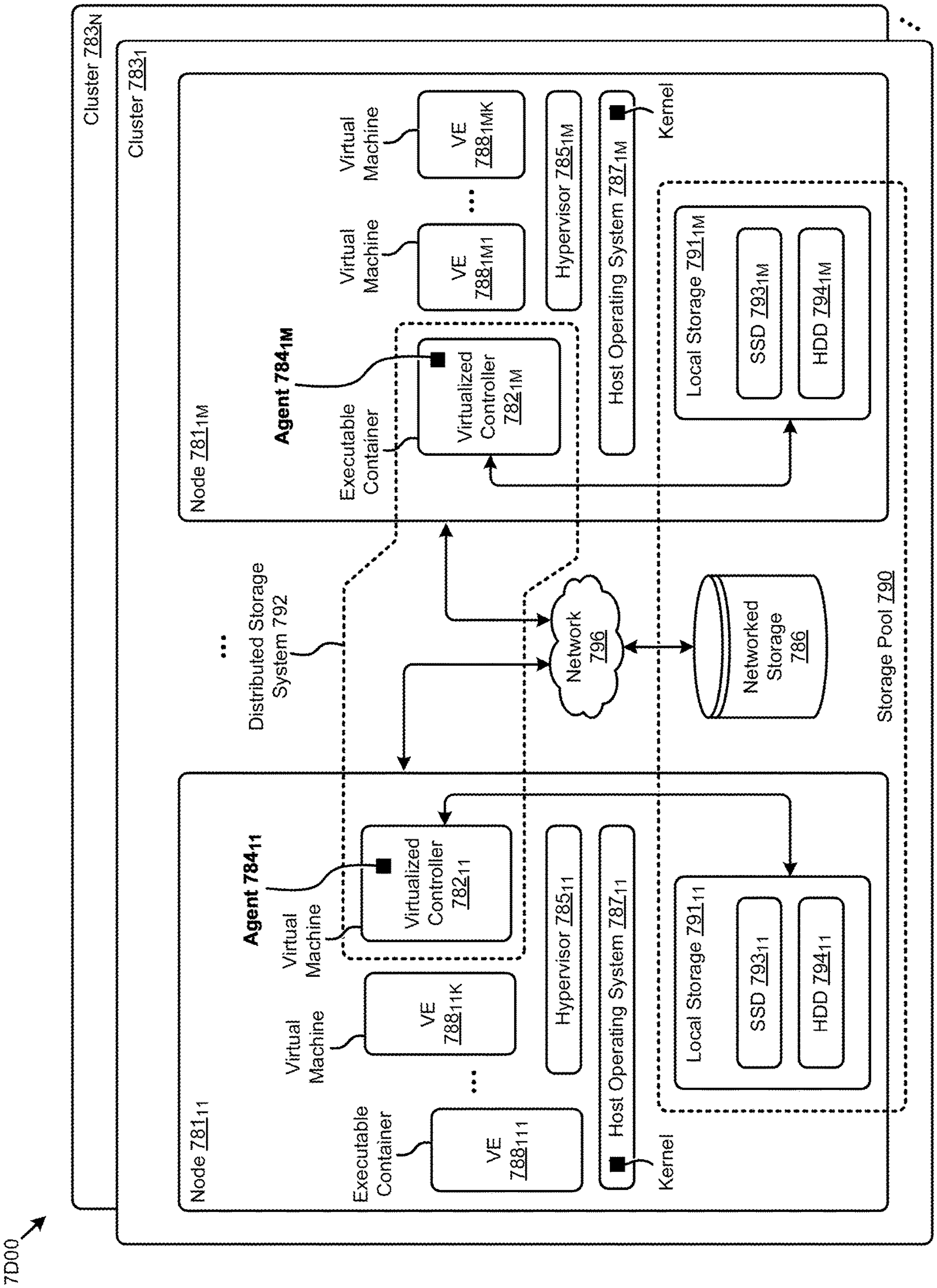

FIG. 7D depicts a distributed virtualization system in a multi-cluster environment 7D00. The shown distributed virtualization system is configured to be used to implement the herein disclosed techniques. Specifically, the distributed virtualization system of FIG. 7D comprises multiple clusters (e.g., cluster $\mathbf{783}_1$, . . . , cluster $\mathbf{783}_N$) comprising multiple nodes that have multiple tiers of storage in a storage pool. Representative nodes (e.g., node $\mathbf{781}_{11}$, . . . , node $\mathbf{781}_{1M}$) and storage pool 790 associated with cluster $\mathbf{783}_1$ are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage $\mathbf{791}_{11}$, . . . , local storage $\mathbf{791}_{1M}$). For example, the local storage can be within or directly attached to a server and/or appliance associated with the nodes. Such local storage can include solid state drives (SSD $\mathbf{793}_{11}$, . . . , SSD $\mathbf{793}_{1M}$), hard disk drives (HDD $\mathbf{794}_{11}$, . . . , HDD $\mathbf{794}_{1M}$), and/or other storage devices.

As shown, any of the nodes of the distributed virtualization system can implement one or more user virtualized entities (e.g., VE $\mathbf{788}_{111}$, VE $\mathbf{788}_{11K}$, VE $\mathbf{788}_{1M1}$, VE $\mathbf{788}_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $\mathbf{787}_{11}$, . . . , host operating system $\mathbf{787}_{1M}$), while the VMs run multiple applications on various respective guest operating systems. Such flexibility can be facilitated at least in part by a hypervisor (e.g., hypervisor $\mathbf{785}_{11}$, . . . , hypervisor $\mathbf{785}_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $\mathbf{787}_{11}$, . . . , host operating system $\mathbf{787}_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 790 by the VMs and/or the executable containers.

Multiple instances of such virtualized controllers can coordinate within a cluster to form the distributed storage system 792 which can, among other operations, manage the storage pool 790. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $\mathbf{781}_{11}$ can interface with a controller virtual machine (e.g., virtualized controller $\mathbf{782}_{11}$) through hypervisor $\mathbf{785}_{11}$ to access data of storage pool 790. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller $\mathbf{782}_{1M}$) in an operating system virtualization environment at a given node. In this case, for example, the virtualized entities at node $\mathbf{781}_{1M}$ can access the storage pool 790 by interfacing with a controller container (e.g., virtualized controller $\mathbf{782}_{1M}$) through hypervisor $\mathbf{785}_{1M}$ and/or the kernel of host operating system $\mathbf{787}_{1M}$.

In certain embodiments, one or more instances of an agent can be implemented in the distributed storage system 792 to facilitate the herein disclosed techniques. Specifically, agent $\mathbf{784}_{11}$ can be implemented in the virtualized controller $\mathbf{782}_{11}$, and agent $\mathbf{784}_{1M}$ can be implemented in the virtualized controller $\mathbf{782}_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to binding intra-container parameters to an external storage cluster can be brought to bear through implementation of any one or more of the foregoing embodiments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts for moving a container-based application from a source HCl cluster to a target HCl cluster, the acts comprising:

establishing an HCl storage cluster data replication mechanism that copies data and metadata from a plurality of storage devices that constitute a storage pool of the source HCl cluster;

establishing a container-based application replication mechanism that copies data and metadata from an executable container that is on a node of the source HCl cluster;

storing a container-based application state of the container-based application using the container-based application replication mechanism and storing a storage cluster data state of the HCl storage cluster using the HCl storage cluster data replication mechanism; and combining the container-based application state with the storage cluster data state at the target HCl Cluster.

2. The non-transitory computer readable medium of claim 1, wherein the source HCl cluster is composed of a plurality of nodes, and wherein the storage pool of the source HCl cluster is organized as a contiguous address space accessible from the plurality of nodes.

3. The non-transitory computer readable medium of claim 2, wherein the HCl storage cluster data replication mechanism comprises replicating data of a first address range corresponding to a first one of the plurality of nodes and replicating data of a second address range corresponding to a second one of the plurality of nodes.

4. The non-transitory computer readable medium of claim 1, wherein the container-based application uses the data and metadata from the plurality of storage devices that constitute the storage pool of the source HCl cluster as two or more address ranges of range data.

5. The non-transitory computer readable medium of claim 1, wherein the source HCl cluster corresponds to first infrastructure of a first public computing cloud and the target HCl cluster corresponds to second infrastructure of a second public computing cloud.

6. The non-transitory computer readable medium of claim 5, wherein the first infrastructure of the first public computing cloud implements a first vendor's container infrastructure management tool and wherein the second infrastructure of the second public computing cloud implements a second vendor's container infrastructure management tool.

7. The non-transitory computer readable medium of claim 5, wherein the first infrastructure of the first public computing cloud implements a first vendor's HCl cluster and wherein the second infrastructure of the second public computing cloud implements a second vendor's HCl cluster.

8. The non-transitory computer readable medium of claim 1, further comprising instructions which, when stored in memory and executed by the processor cause the processor to perform further acts of moving the container-based application state to a location different from either the source HCl cluster or the target HCl cluster.

9. A method for moving a container-based application from a source HCl cluster to a target HCl cluster, the method comprising:

establishing an HCl storage cluster data replication mechanism that copies data and metadata from a plurality of storage devices that constitute a storage pool of the source HCl cluster;

establishing a container-based application replication mechanism that copies data and metadata from an executable container that is on a node of the source HCl cluster;

storing a container-based application state of the container-based application using the container-based application replication mechanism and storing a storage cluster data state of the HCl storage cluster using the HCl storage cluster data replication mechanism; and combining the container-based application state with the storage cluster data state at the target HCl Cluster.

10. The method of claim 9, wherein the source HCl cluster is composed of a plurality of nodes, and wherein the storage pool of the source HCl cluster is organized as a contiguous address space accessible from the plurality of nodes.

11. The method of claim 10, wherein the HCl storage cluster data replication mechanism comprises replicating data of a first address range corresponding to a first one of the plurality of nodes and replicating data of a second address range corresponding to a second one of the plurality of nodes.

12. The method of claim 9, wherein the container-based application uses the data and metadata from the plurality of storage devices that constitute the storage pool of the source HCl cluster as two or more address ranges of range data.

13. The method of claim 9, wherein the source HCl cluster corresponds to first infrastructure of a first public computing cloud and the target HCl cluster corresponds to second infrastructure of a second public computing cloud.

14. The method of claim 13, wherein the first infrastructure of the first public computing cloud implements a first vendor's container infrastructure management tool and wherein the second infrastructure of the second public computing cloud implements a second vendor's container infrastructure management tool.

15. The method of claim 13, wherein the first infrastructure of the first public computing cloud implements a first vendor's HCl cluster and wherein the second infrastructure of the second public computing cloud implements a second vendor's HCl cluster.

16. The method of claim 9, further comprising moving the container-based application state to a location different from either the source HCl cluster or the target HCl cluster.

17. A system for moving a container-based application from a source HCl cluster to a target HCl cluster, the system comprising:

a storage medium having stored thereon a sequence of instructions; and a processor that executes the sequence of instructions to cause the processor to perform acts comprising, establishing an HCl storage cluster data replication mechanism that copies data and metadata from a plurality of storage devices that constitute a storage pool of the source HCl cluster;

establishing a container-based application replication mechanism that copies data and metadata from an executable container that is on a node of the source HCl cluster;

storing a container-based application state of the container-based application using the container-based application replication mechanism and storing a storage cluster data state of the HCl storage cluster using the HCl storage cluster data replication mechanism; and combining the container-based application state with the storage cluster data state at the target HCl Cluster.

18. The system of claim 17, wherein the source HCl cluster is composed of a plurality of nodes, and wherein the storage pool of the source HCl cluster is organized as a contiguous address space accessible from the plurality of nodes.

19. The system of claim 18, wherein the HCl storage cluster data replication mechanism comprises replicating data of a first address range corresponding to a first one of the plurality of nodes and replicating data of a second address range corresponding to a second one of the plurality of nodes.

20. The system of claim 17, wherein the container-based application uses the data and metadata from the plurality of storage devices that constitute the storage pool of the source HCl cluster as two or more address ranges of range data.

21. The system of claim 17, wherein the source HCl cluster corresponds to first infrastructure of a first public computing cloud and the target HCl cluster corresponds to second infrastructure of a second public computing cloud.

22. The system of claim 21, wherein the first infrastructure of the first public computing cloud implements a first vendor's container infrastructure management tool and wherein the second infrastructure of the second public computing cloud implements a second vendor's container infrastructure management tool.

23. The system of claim 21, wherein the first infrastructure of the first public computing cloud implements a first vendor's HCl cluster and wherein the second infrastructure of the second public computing cloud implements a second vendor's HCl cluster.

24. The system of claim 17, further comprising instructions which, when stored in memory and executed by the processor cause the processor to perform further acts of moving the container-based application state to a location different from either the source HCl cluster or the target HCl cluster.

* * * * *